United States Patent
Kiyokawa

(10) Patent No.: US 12,507,719 B2
(45) Date of Patent: Dec. 30, 2025

(54) JIG FOR FORMING PLATE-SHAPED COOKED RICE AND DEVICE FOR PRODUCING PLATE-SHAPED COOKED RICE

(71) Applicant: POTAMA CO., LTD., Okinawa (JP)

(72) Inventor: Katsuaki Kiyokawa, Okinawa (JP)

(73) Assignee: POTAMA CO., LTD., Okinawa (JP)

( * ) Notice: Subject to any disclaimer, the term of this patent is extended or adjusted under 35 U.S.C. 154(b) by 346 days.

(21) Appl. No.: 18/318,463

(22) Filed: May 16, 2023

(65) Prior Publication Data
US 2023/0301332 A1 Sep. 28, 2023

Related U.S. Application Data

(63) Continuation of application No. PCT/JP2020/042800, filed on Nov. 17, 2020.

(51) Int. Cl.
 A23L 7/196 (2016.01)
 A23P 30/10 (2016.01)
 A47J 43/20 (2006.01)

(52) U.S. Cl.
 CPC ............. *A23L 7/1965* (2016.08); *A23P 30/10* (2016.08); *A47J 43/20* (2013.01)

(58) Field of Classification Search
 CPC .......... A47J 43/20; A23P 30/10; A23L 7/1965
 See application file for complete search history.

(56) References Cited

U.S. PATENT DOCUMENTS

2017/0020164 A1* 1/2017 Sekimori ................ A23L 7/117

FOREIGN PATENT DOCUMENTS

| JP | S60-028898 U | 2/1985 |
|---|---|---|
| JP | 1987-128779 U | 8/1987 |
| JP | 1992-016584 U | 2/1992 |
| JP | H07231758 A | * 9/1995 |
| JP | H11-318363 A | 11/1999 |
| JP | 2010-124710 A | 6/2010 |
| JP | 3187074 U | 10/2013 |
| JP | 2014-034821 A | 2/2014 |
| JP | 2016-015934 A | 2/2016 |
| JP | 2016-210624 A | 12/2016 |

OTHER PUBLICATIONS

English Translation for JP H07231758 (Year: 1995).*
Office Action issued for the corresponding Japanese Patent Application No. 2022-563273, mailed Nov. 26, 2024, along with its English translation, 12 pages.
International Search Report dated Dec. 28, 2020, for the corresponding patent application No. PCT/JP2020/042800, with English translation.

* cited by examiner

*Primary Examiner* — Seyed Masoud Malekzadeh
(74) *Attorney, Agent, or Firm* — LUCAS & MERCANTI, LLP

(57) ABSTRACT

A plate-shaped cooked rice molding jig includes: a molding frame having a through window formed of a side molding surface that molds an outer peripheral side portion of the plate-shaped cooked rice; and a base plate having lower portion molding surface for molding a bottom side portion of the plate-shaped cooked rice on an upper surface thereof. In a state where the molding frame is placed on the base plate, a cooked rice storing space that stores the cooked rice by covering the through window by the base plate from below, and a slatted mat placing portion for placing a slatted mat between the molding frame and the base plate is formed.

6 Claims, 16 Drawing Sheets

(a)

(b)

(a)

(b)

(a)

(b)

JIG FOR FORMING PLATE-SHAPED COOKED RICE AND DEVICE FOR PRODUCING PLATE-SHAPED COOKED RICE

CROSS-REFERENCE TO RELATED APPLICATION

This is a continuation of PCT/JP2020/042800 filed on Nov. 17, 2020, the contents of which are incorporated herein by reference.

TECHNICAL FIELD

The present invention relates to a plate-shaped cooked rice molding jig for molding a cooked rice in a flat plate shape having a desired thickness, and a plate-shaped cooked rice manufacturing device.

BACKGROUND ART

Conventionally, a cooked rice food that is formed into a desired shape using a cooked rice molded into a plate shape (hereinafter simply referred to as "plate-like cooked rice" has been popularly eaten. Such a cooked rice food includes: a rolled sushi having a rolled shape that is formed by winding various food ingredients such as a Japanese omelets, a dried gourd and the like that are placed on an upper surface of a plate-shaped cooked rice together with the cooked rice, or an onigiri that is formed by folding a plate-like cooked rice twofold while containing a food ingredient in a sandwiched manner.

An operation of forming such a plate-shaped cooked rice in a twofold shape largely depends on an amount of experience and a level of a skill of an operator. As a result, in a case where a cooked rice is not sufficiently uniformly spread or a cooked rice is gathered to a particular place, in the molded plate-shaped cooked rice, uneven portions that differ in an amount of cooked rice are formed in a spotted manner and hence, so-called uneven thickness spots" where a plate thickness or a plate shape of the cooked rice food becomes non-uniform occurs.

To cope with such a problem, there has been proposed a plate-shaped cooked rice molding jig having the following configuration (for example, patent literature 1). The plate-shaped cooked rice molding jig includes a shallow-bottomed box shaped molding frame that is continuously connected to a distal end of a grip portion and has an opening on an upper side of the molding frame. A cooked rice is pressed down in the molding frame so as to form a molded cooked rice lump. By removing the molded cooked rice lump from the molding frame, a plate-shaped cooked rice that conforms to an inner shape of the molding frame is molded.

There has been also proposed a plate-shaped cooked rice manufacturing device having the following configuration (see patent literature 2). A leveling mechanism for leveling a cooked rice is communicably connected to a lower portion of a hopper that stores a cooked rice. The leveling mechanism is formed of a plurality of rolling rollers that are vertically disposed in a cooked rice supply passage in a housing.

CITATION LIST

Patent Literature

[Patent Literature 1] JP H11-318363 A
[Patent Literature 2] JP 2010-124710 A

SUMMARY OF INVENTION

Technical Problem

However, the molded cooked rice lump is molded into a mold shape in a state where the molded cooked rice lump is filled in the inside of the mold by spreading by leveling while pressing and collapsing the cooked rice stored in the mold frame toward a mold bottom portion using a spatula (shamoji in Japanese). Accordingly, the collapsed cooked rice grains unintendedly adhere to the mold bottom portion due to the adhesiveness of the cooked rice grains and hence, there is a possibility that it is difficult to speedily remove the molded cooked rice lump from the molding frame.

The molding jig disclosed in patent literature 1 is not suitable in a restaurant and catering industry where it is necessary to supply a large number of plate-shaped cooked rice having a predetermined shape within a short time.

Further, with respect to the device disclosed in patent literature 2, although the device can mold a plate-shaped cooked rice having a predetermined thickness and a predetermined shape continuously in a stable manner, an internal mechanism is complicated and hence, a device cost is pushed up whereby the device is economically disadvantageous. Further, there is a concern that cleaning and maintenance property such as an exchange of a member become insufficient.

The present invention has been made in view of such circumstances, and it is an object of the present invention to provide a plate-shaped cooked rice molding jig and a plate-shaped cooked rice manufacturing device that has the simplified structure, exhibits high economic property and high maintenance property, and can mold plate-shaped cooked rice having a desired thickness and a desired shape continuously and in a stable manner.

Solution to Problem

To solve the above-mentioned problems, a plate-shaped cooked rice molding jig according to the present invention is (1) a plate-shaped cooked rice molding jig for storing a cooked rice therein and molding the cooked rice into a plate-shaped cooked rice, wherein the plate-shaped cooked rice molding jig including: a molding frame having a through window formed of a side molding surface that molds an outer peripheral side portion of the plate-shaped cooked rice; and a base plate having lower portion molding surface for molding a bottom side portion of the plate-shaped cooked rice on an upper surface thereof, wherein in a state where the molding frame is mounted on the base plate, a cooked rice storing space that stores the cooked rice by covering the through window by the base plate from below is formed, and a slatted mat placing portion for placing a slatted mat between the molding frame and the base plate is formed.

The plate-shaped cooked rice molding jig according to the present invention also has the following technical features.
(2) A molding frame engaging-by-fitting portion is formed on an upper surface of the base plate in a state where the molding frame is engageable with the molding frame by fitting at a position above the slatted mat placing portion.
(3) The slatted mat placing portion is formed of a slatted mat placing stepped portion where an inner side surface is formed as a contact surface that is brought into contact with an outer side surface of the slatted mat and an upper surface is formed as a surface on which the mold frame is mounted thus allowing the slatted mat to engage with the slatted mat placing stepped portion, and protrudes from an upper surface of the base plate.

(4) In a state where the molding frame is configured such that the slatted mat is mounted on the slatted mat placing portion and the molding frame is mounted on the base plate, a slatted mat pressing protruding portion that is brought into contact with and corresponds with an upper surface of the slatted mat is formed in a downwardly protruding manner from a lower side opening edge of the through window.

A plate-shaped cooked rice manufacturing device according to the present invention includes (5): the plate-shaped cooked rice molding jig according to any one of (1) to (4); a conveyance unit for conveying the plate-shaped cooked rice molding jig; and a cooked rice supply unit that is disposed at a start end portion or a middle portion of the conveyance unit, and discharges a predetermined amount of the cooked rice toward the inside of the plate-shaped cooked rice molding jig from a position above the conveyance unit.

The plate-shaped cooked rice manufacturing device according to the present invention also has the following technical features.

(6) The conveyance unit includes a pair of conveyance rails held at a predetermined interval therebetween, and is configured to be capable of conveying the plate-shaped cooked rice molding jig in a state where both end portions of the plate-shaped cooked rice molding jig are supported between the conveyance rails.

(7) The conveyance rail includes: a guide longitudinal wall portion of a vertical portion that is brought into contact with and corresponds to an outer side wall portion of the plate-shaped cooked rice molding jig; and a guide lateral wall portion of a horizontal portion that extends in an orthogonal direction from the guide longitudinal wall portion and is brought into contact with and corresponds to an outer bottom wall portion of the plate-shaped cooked rice molding jig.

(8) The guide lateral wall portion includes a plurality of conveyance rollers that are rotatably and pivotally supported along an extending direction of the conveyance rail.

Advantageous Effects of Invention

According to one embodiment of the present invention, the plate-shaped cooked rice molding jig has the simplified structure, exhibits excellent economic property and excellent maintenance property, and can mold a plate-shaped cooked rice having a desired thickness and a desired shape continuously in a stable manner.

The plate-shaped cooked rice molding jig according to the present invention (hereinafter also simply referred to as the present jig) has the detachable structure where the molding frame and the base plate that respectively correspond to an outer peripheral side portion and a bottom side portion of the plate-shaped cooked rice to which a pressing force is likely to be applied at the time of performing a cooked rice spreading operation are formed as separate bodies from each other and the molding frame and the base plate are assembled as a unit. Accordingly, an operation of removing the frame is performed in order for respective molding functions that the respective unit components have.

That is, according to the present jig, by only performing a simple operation where a cooked rice stored in a cooked rice storing space that is formed in a state that the molding frame is placed on the base plate and, then, the cooked rice is spread by leveling approximately in parallel in plane such that a lower surface of a spatula or the like and an upper surface of the molding frame are brought into contact with each other, the entire region of the cooked rice storing space is filled with the cooked rice without forming any gap while adjusting a downward pressing force at the time of spreading the cooked rice by leveling and preventing the cooked rice from sticking out to the outside of the molding frame. Accordingly, it is possible to mold a molded cooked rice lump having a predetermined thickness that agrees with a thickness of the molding frame and a predetermined shape that conforms to the shape of the cooked rice storing space.

That is, in the cooked rice storing space in a state where the molding frame is placed on the base plate, a most portion the molding space at the center of an upper surface of a sheet-shaped food is used as a lower molding surface for molding a bottom side portion of the plate-shaped cooked rice, and an inner peripheral surface of the molding frame in which the through window is formed is used as a side molding surface for molding an outer peripheral side portion of the plate-shaped cooked rice.

According to the present jig in such a state, the cooked rice is placed and stored on the lower molding surface of the base plate, and the cooked rice is simply spread by leveling over the entire region in the cooked rice storing space while downwardly pressing the cooked rice using a leveling spatula or the like such that the cooked rice is brought into contact with the side molding surface of the molding frame, an integral molded cooked rice lump for a sheet-shaped food that conforms to an outer shape of the cooked rice storing space can be molded. Further, at the time of performing an operation of spreading a cooked rice by leveling, there is no possibility of the displacement of a cooked rice that the cooked rice sticks out from the sheet-shaped food.

Further, by simply removing by pulling the molding frame upward from the molded cooked rice lump that is molded by spreading the cooked rice by leveling such that the cooked rice storing space is fully filled with the cooked rice, it is possible to easily impart a shearing force orthogonal to an adhering direction that separates the cooked rice generated between the outer peripheral side portion of the molded cooked rice lump and the side molding surface of the molding frame. Accordingly, it is possible to manufacture the uniform plate-shaped cooked rice that has no "uneven thickness spots" on the outer peripheral surface on the base plate.

Further, after the molding frame is removed, the plate-shaped cooked rice that is formed integrally with the sheet-shaped food in a state where the sheet-shaped food adheres to the bottom surface is manufactured by molding in a state where the plate-shaped cooked rice is placed on the slatted mat on the base plate. Accordingly, time and efforts for placing the plate-shaped cooked rice on the slatted mat as an additional step becomes unnecessary. Accordingly, a rolling or folding operation where various ingredients such as Japanese omelet are disposed on the plate-shaped cooked rice directly and these food stuffs are rolled or folded can be easily performed.

Further after the molding operation is finished, the molding frame and the base plate that are respective unit components can be separately removed, and can be washed cleanly and hence, the molding frame and the base plate can be constantly repeatedly used hygienically.

Further, according to one embodiment of the invention, the molding frame engaging-by-fitting portion is formed on an upper surface of the base plate in a state where the molding frame is engageable with the molding frame by fitting at a position above the slatted mat. With such a configuration, time and efforts for positioning of the molding frame at the time of placing the molding frame on the base plate.

It is possible to prevent unexpected positional displacement or removal of the molding frame on the base plate at the time of performing a cooked rice leveling operation in the cooked rice storing space in a state where the molding frame is placed on the base plate in a fitting engagement state.

According to one embodiment of the invention, it is possible to eliminate time and efforts for positioning the slatted mat on the base plate.

At the time of performing an operation of leveling cooked rice in the cooked rice holding space in a state where the molding frame is placed on the base plate, it is possible to prevent the unexpected positional displacement of the slatted mat disposed between the base plate and the molding frame.

According to one embodiment of the invention, it is possible to close with certainty a gap unexpectedly formed between the lower surface of the molding frame and the upper surface of the slatted mat.

That is, in a state where the molding frame is placed on the base plate, the slatted mat pressing protruding portion that is formed by extending downward the inner peripheral wall of the molding frame such that the slatted mat pressing protruding portion fringes a lower opening edge portion of the through window is brought into pressure contact with the upper surface of the slatted mat along with downward pressing of the molding frame. With such a configuration, there is no possibility that a gap is formed between the inner peripheral wall of the molding frame that forms the cooked rice storing space and the upper surface of the slatted mat. Accordingly, it is possible to acquire an advantageous effect that it is possible to prevent the cooked rice from unexpectedly leaking from a lower end edge portion at the time of performing an operation of leveling a cooked rice in the cooked rice storing space and hence, a plate-shaped cooked rice having favorable moldability where lower corner portions are neatly molded can be manufactured.

According to one embodiment of the invention, a part cost can be reduced by simplifying the device structure, anybody can simply manufacture a cooked rice without expertise, and cooked rice can be continuously manufactured along a manufacture line of cooked rice in a final product mode such as a rolled state or a bent state where ingredients are embraced in the cooked rice and hence, an operation efficiency can be remarkably enhanced.

That is, the plate-shaped cooked rice manufacturing device is configured such that the plate-shaped cooked rice molding frame that is formed of the detachable molding frame and the base plate both being dedicated for molding of the plate-shaped cooked rice having a desired shape and a desired thickness is formed as one unit, and a plurality of the units can be conveyed by the conveyance unit. With such a configuration, it is possible acquire an advantageous effect that, it is possible to easily build up a manufacturing line where cooked rice is manufactured by an assembly line operation by arranging a plurality of operators or a single operator on a side of the plate-shaped cooked rice manufacturing device along a conveyance direction.

After the device is used, the plate-shaped cooked rice molding jig with which a cooked rice is mainly brought into contact is removed from the conveyance unit, and a polite and simple cleaning operation of the plate-shaped cooked rice molding jig can be performed and hence, the device can be used in a constantly hygienic state.

According to one embodiment of the plate-shaped cooked rice manufacturing device, the plate-shaped cooked rice molding jig can be manually conveyed in a sliding manner in a conveyance direction that the pair of rails extend in a state where the plate-shaped cooked rice molding jig traverses between the pair of rails. Accordingly, a large-sized drive source is unnecessary and hence, the reduction of cost and space saving can be realized.

According to one embodiment of the plate-shaped cooked rice manufacturing device, it is possible to acquire an advantageous effect that an unexpected derailing of the plate-shaped cooked rice molding jig from the conveyance rails during the sliding conveyance can be prevented.

According to one embodiment of the plate-shaped cooked rice manufacturing device, a slid frictional force between both end portions of the plate-shaped cooked rice molding jig and the conveyance rails can be reduced as much as possible. Accordingly, it is possible to acquire an advantageous effect that the sliding conveyance of the plate-shaped cooked rice molding jig can be performed more efficiently.

DESCRIPTION OF EMBODIMENTS

Figure 1:
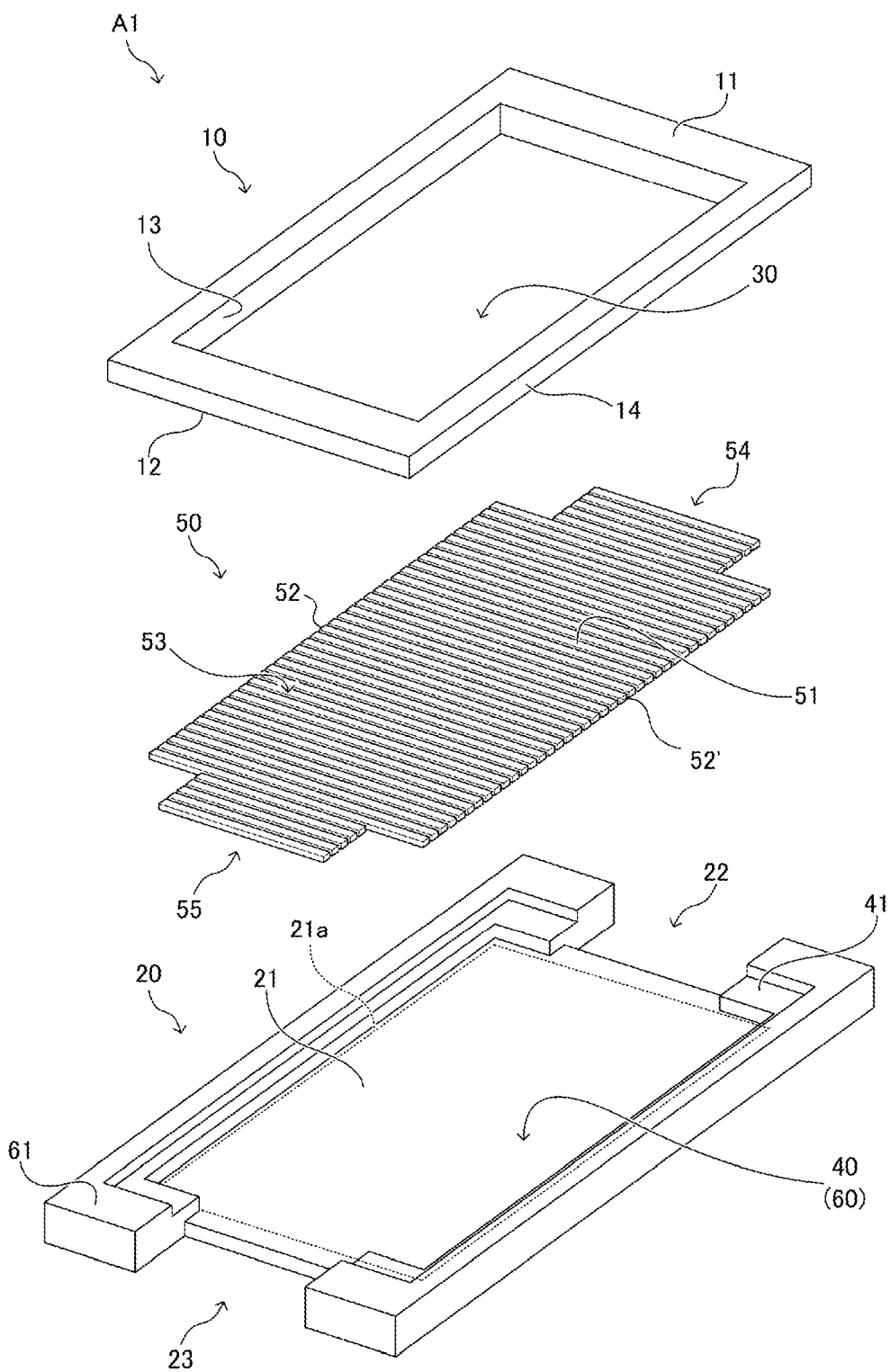
FIG. 1 is an exploded perspective view illustrating the configuration of a plate-shaped cooked rice molding jig according to a first embodiment.
Figure 2:
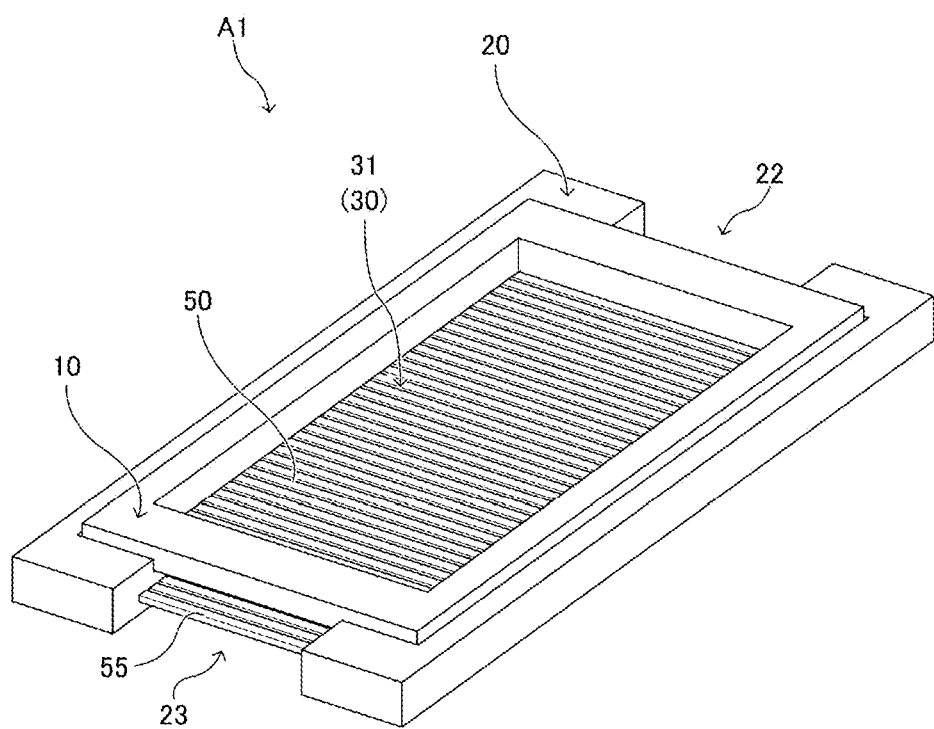
FIG. 2 is an assembled perspective view illustrating the configuration of the plate-shaped cooked rice molding jig according to the first embodiment.
Figure 3:
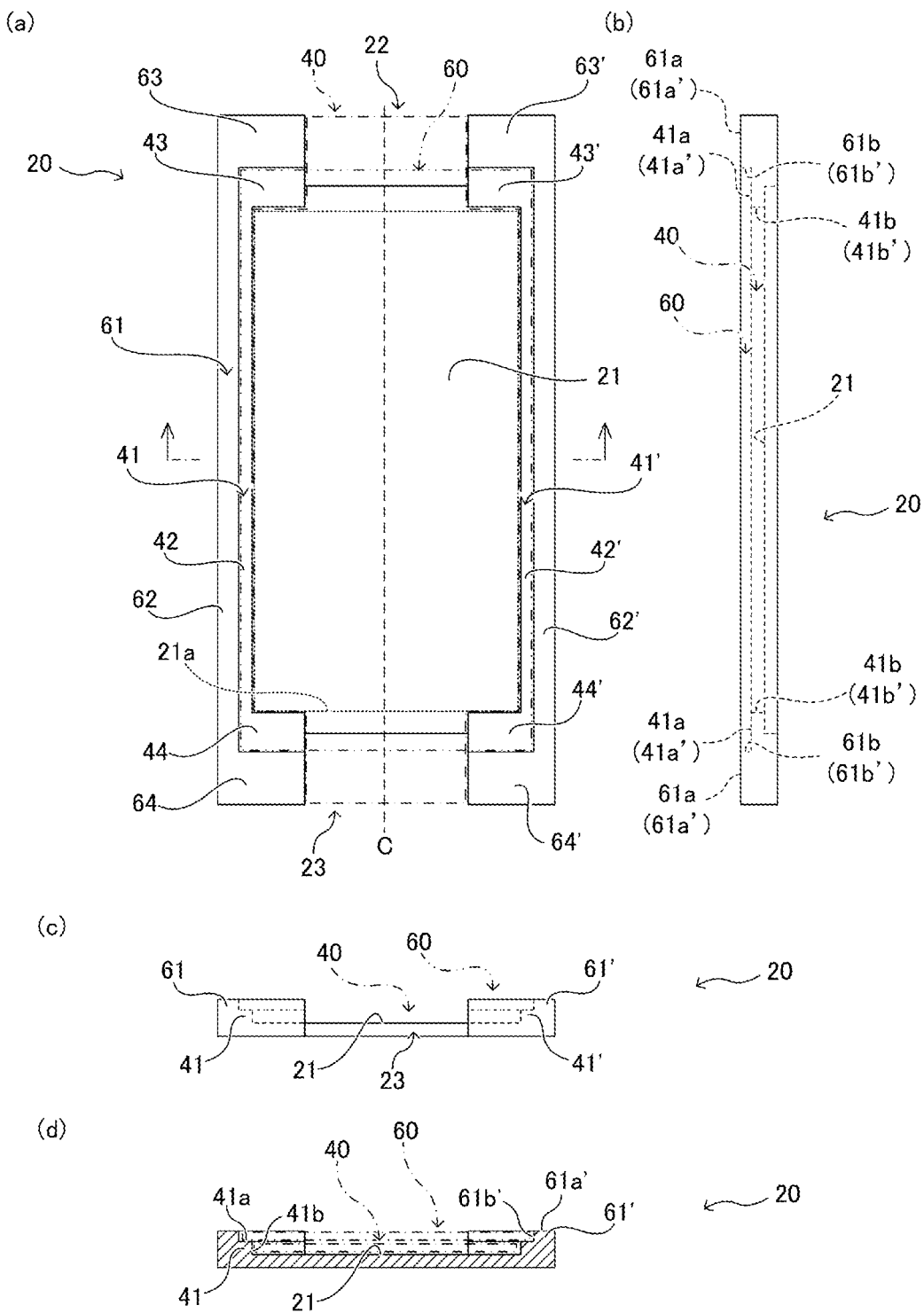
FIG. 3 is an explanatory view illustrating the configuration of a base plate according to the first embodiment.
Figure 12:
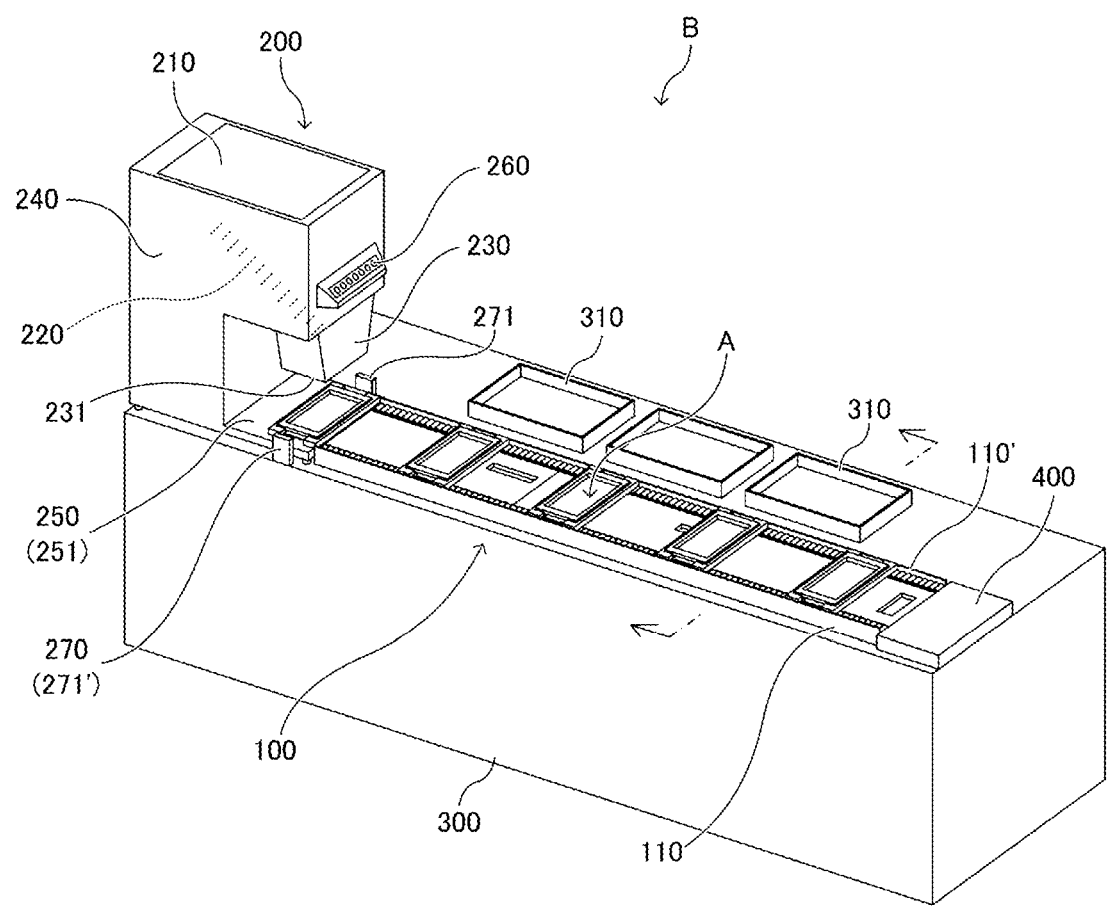
FIG. 12 is a schematic exploded perspective view of a plate-shaped cooked rice manufacturing device provided with the plate-shaped cooked rice molding jig according to the present invention.

Hereinafter, the present invention is described in the following order.
 (1) The summary of a plate-shaped cooked rice molding jig and a plate-shaped cooked rice manufacturing device according to the present invention
 (2) A plate-shaped cooked rice molding jig according to a first embodiment
 (3) A plate-shaped cooked rice molding jig according to a second embodiment
 (4) A leveling spatula used in the plate-shaped cooked rice molding jig of the present invention
 (5) A use example of the plate-shaped cooked rice molding jig according to the present invention
 (6) A plate-shaped cooked rice manufacturing device provided with a plate-shaped cooked rice molding jig according to the present invention
 (7) A use example of the plate-shaped cooked rice manufacturing device provided with a plate-shaped cooked rice molding jig according to the present invention (1) the Summary of a Plate-Shaped Cooked Rice Molding Jig and a Plate-Shaped Cooked Rice Manufacturing Device According to the Present Invention First, the summary of the plate-shaped cooked rice molding jig according to the present invention and the plate-shaped cooked rice manufacturing device according to the present invention is described. FIG. 1 is an exploded perspective view illustrating the configuration of the plate-shaped cooked rice molding jig. FIG. 2 is an assembled perspective view illustrating the configuration of the plate-shaped cooked rice molding jig. FIG. 8 to FIG. 11 are schematic perspective views illustrating a use state of the plate-shaped cooked rice molding jig. FIG. 12 is an overall perspective view illustrating the configuration of the plate-shaped cooked rice manufacturing device provided with the plate-shaped cooked rice molding jig.

The plate-shaped cooked rice molding jig according to the present invention (hereinafter, simply referred to as the present invention) that stores a cooked rice in the inside of the present jig, and is used for continuously molding a plate-shaped cooked rice in a state before food ingredients are placed on the plate-shaped cooked rice and are rolled together with the plate-shaped cooked rice in steps of manufacturing a cooked rice food such as a rolled sushi formed in a rolled state while containing food ingredients or an onigiri that is formed by folding a plate-like cooked rice twofold.

The present jig A1 substantially has, as illustrated in FIG. 1 and FIG. 2, a unit structure that is formed by combining a molding frame 10 that has a through window 30 and a base plate 20 on which the molding frame 10 is placed to each other.

In manufacturing a plate-shaped cooked rice by the present jig A1, as illustrated in FIG. 9(a), firstly, a slatted mat 50 is mounted in a slatted mat placing portion 40 disposed in the inside of the base plate 20. Next, as illustrated in FIG. 9(b), a sheet-shaped food S is placed on an upper surface 51 of the slatted mat 50 from above in an overlapping manner. Next, as illustrated in FIG. 2 and FIG. 10(a), the molding frame 10 is placed on the sheet-shaped food S from above in an overlapping manner so that a lower opening of the through window 30 of the molding frame 10 is closed by an upper surface of the base plate 20, that is, by an upper surface of the sheet-shaped food S that is placed on the slatted mat 50 in an overlapping manner thus forming a cooked rice storing space 31.

In the above-mentioned configuration, the shape of the molding frame 10 as viewed in a plan view and the shape of the through window 30 disposed inside the molding frame 10 as viewed in a plan view can be suitably decided in conformity with a molding profile of a desired plate-shaped cooked rice. For example, as the shapes of the molding frame 10 and the through window 30, an approximately circular shape, a trapezoidal shape, a triangular shape may be adopted.

The sheet-shaped food S may be, besides a processed food in general such as seaweed or dried kelp (konbu in Japanese), a natural food such as perilla (ohba in Japanese). It is preferable to use a standardized sheet-shaped food having a predetermined shape and a predetermined size.

The sheet-shaped food S that is standardized in this manner has a specific size and a specific shape, for example, a square shape as viewed in a plan view having a longitudinal size of 200 mm to 210 mm and a lateral size of 180 mm to 200 mm in case of "full size", a rectangular shape as viewed in a plan view having a longitudinal size of 95 mm to 105 mm and a lateral size of 180 mm to 200 mm in case of "laterally cut in two (half)" that has an area approximately ½ of an area of "full size", a rectangular shape as viewed in a plan view having a longitudinal size of 60 mm to 70 mm and a lateral size of 180 mm to 200 mm in case of "laterally cut in three (cut in three)" that has an area approximately ⅓ of an area of "full size", and a rectangular shape as viewed in a plan view having a longitudinal size of 25 mm to 35 mm and a lateral size of 180 mm to 200 mm in case of "laterally cut in six (cut in six)" that has an area approximately ⅙ of an area of "full size". In this manner, the size and the shape of the sheet-shaped food S are suitably selected in conformity with the configuration and the size of a desired cooked rice food.

In other words, in the present jig A1, the molding frame 10 and the base plate 20 are designed corresponding to the sizes and the shapes of these standardized sheet-shaped foods S.

The thickness of the molding frame 10 is substantially same as the thickness of the plate-shaped cooked rice molded by the molding frame 10 and hence, the thickness of the molding frame 10 is suitably determined corresponding to the desired thickness of the plate-shaped cooked rice. For example, in a case of molding a plate-shaped cooked rice R3 for a rolled sushi in general or onigiri in a bent shape, the thickness of the molding frame 10 is preferably set to 8 mm to 12 mm.

Cooked rice R1 stored in the cooked rice storing space 31 of the present jig A1 is formed into molded cooked rice lump R2 that conforms to the outer shape of the cooked rice storing space 31 and has the same thickness as the molding frame 10 by downwardly pressing the leveling spatula 70 such that a lower surface of the spatula 70 is brought into contact with an upper surface of the molding frame 10 as illustrated in FIG. 10(b) thus spreading the cooked rice by leveling over the entire region in the cooked rice storing space 31.

As shown in FIG. 11(b), an ingredient I such as a luncheon meat or a Japanese omelet is placed on an upper surface of the plate-shaped cooked rice R3 that is obtained as described above, and the plate-shaped cooked rice R3 is directly bent by way of the slated mat 50 thus reshaping the plate-shaped cooked rice R3 to an onigiri in a folded state served in a shop or the like, that is, a cooked rice food R4.

To arrange a series of manufacturing steps from the cooked rice R1 to the plate-shaped cooked rice R3 or the cooked rice food R4 performed by the present jig A1 in order as a line, as illustrated in FIG. 12, the plate-shaped cooked rice manufacturing device according to the present invention (hereinafter also referred to as the present device B) includes; a conveyance unit 100 for conveying the plate-shaped cooked rice molding jig A1; and a cooked rice supply unit 200 that is disposed at a start end portion or a middle portion of the conveyance unit 100, and discharges a predetermined amount of the cooked rice R1 toward the inside of the plate-shaped cooked rice molding jig A1 from a position above the conveyance unit 100.

The present device B functions as "a cooked rice food manufacturing line" where an operator manually performs the respective manufacturing steps in order. The present device B can be installed in a limited and narrow working space such as a kitchen of a shop and hence, operation efficiency can be remarkably enhanced. Accordingly, it is safe to say that the present device B is an epoch-making device in the food and beverage retailing field that can serve the freshly prepared cooked rice food R4 at the shop.

(2) Plate-Shaped Cooked Rice Molding Jig According to First Embodiment

Next, the configuration of the plate-shaped cooked rice molding jig according to first embodiment is described in detail with reference to the drawings. FIG. 3(a) to FIG. 3(d) are a plan view, a side view, a rear view, and a transverse cross-sectional view illustrating the configuration of a base plate, FIG. 4(a) to FIG. 4(d) are a bottom view, a side view, a rear view, and a transverse cross-sectional view illustrating the configuration of a molding frame. FIG. 5(a) to FIG. 5(b) are schematic transverse cross-sectional views illustrating a fitting engagement state between the base plate and the molding frame.

Hereinafter, the description is made with respect to the molding frame and the base plate that are prepared referencing the size and the shape of "laterally cut in two (half)" cooked rice as the sheet-shaped food S.

As illustrated in FIG. 1 to FIG. 4, the present jig A1 includes: a molding frame 10 having a through window 30 formed of a side forming surface 11 that molds an outer peripheral side portion of the plate-shaped cooked rice R3; and a base plate 20 having a lower portion molding surface 21a for molding a bottom side portion of the plate-shaped cooked rice on an upper surface 21 thereof.

In the present jig A1, as illustrated in FIG. 2, in a state where the molding frame 10 is placed on the base plate 20, a rice storing space 31 that stores the cooked rice R1 by covering the through window 30 by the base plate 20 from below is formed, and a slatted mat placing portion 40 for placing a slatted mat 50 between the molding frame 10 and the base plate 20 is formed.

As shown in FIG. 1 and FIG. 3(a) to FIG. 3(c), the base plate 20 is a flat plate body having a predetermined thickness, and is formed in an approximately H shape as viewed in a plan view by forming front and rear side notched portions 22, 23 by cutting away front and rear end edge center portions of the upper surface 21 of the base plate 20 forming a flat surface in a rectangular shape inward from front and rear portions.

The thickness (height) of the slatted mat placing portion 40 is set to a sum of the thickness of the slatted mat 50 and the thickness of the sheet-shaped food S or more. Although the detail is described later, in a case where the slatted mat pressing protruding portion 18 is formed on the molding frame 10, the height of the slatted mat placing portion 40 is set to approximately a sum of the thickness of the slatted mat 50, the thickness of the sheet-shaped food S and the thickness of the slatted mat pressing protruding portion 18 by taking into account a clearance of an amount corresponding to fitting of the slatted mat pressing protruding portion 18 into the slatted mat placing portion 40.

With respect to the slatted mat placing portion 40, inner side surfaces 42 form contact surfaces that are brought into contact with outer side surfaces 52 of the slatted mat 50, and a pair of slatted mat placing stepped portions 41, 41' where an upper surface 43 forms a placing surface of the molding frame 10 are formed in an upwardly protruding manner from the upper surface 21 of the base plate 20 so that an inner space portion (indicated by a chained line in FIG. 3(a) and FIG. 3(b)) surrounded by the slatted mat placing stepped portions 41, 41' is formed.

As illustrated in FIG. 3(a), the slatted mat placing stepped portion 41, 41' includes: a center long side wall portion 42, 42' that corresponds to a longitudinal side of a U shape as viewed in a plan view and has an elongated rectangular rod shape that extends in the longitudinal direction along left or right edge portion of the base plate 20; and a front-side short side wall portion 43, 43' and a rear-side short side wall portion 44, 44' that correspond to upper and lower lateral sides of the U shape as viewed in a plan view, has a short rectangular plate shape, and is bent at a right angle and extends along a corner portion of the base plate 20 at the front and rear end portions 43, 43' of the center long side wall portions 42, 42'.

Two slatted mat placing stepped portions 41, 41' having such a configuration are formed by arranging the center long side wall portions 42, 42' on the left and right end portions of the upper surface 21 of the base plate 20, and by arranging the front-side short side wall portions 43, 43' and the rear-side short side wall portions 44, 44' on the left and right sides of the front and rear end portions of the upper surface 21 of the base plate 20.

The inner side surfaces 41b, 41b' of the slatted mat placing stepped portions 41, 41' are formed of vertical flat surfaces orthogonal to the upper surfaces 41a, 41a'. The inner side surfaces 41b, 41b' opposedly face the outer side surfaces 52, 52' of the slatted mat 50, and function as restricting surfaces that restrict the movement of the slatted mat 50 that engages with the slatted mat placing portion 40 by fitting engagement in the front, rear, left and right directions.

The respective inner side surfaces of the front and rear side short wall portions 43, 43', 44, 44' form contact surfaces that opposedly face and are brought into contact with the left and right front and rear end outer side surfaces of the sheet-shaped food placing portion 53 and the left and right outer side surfaces of the front and rear side hand gripping portions 54, 55.

The slatted mat 50 that engages with the slatted mat placing portion 40 by fitting engagement is, as illustrated in FIG. 1 and FIG. 2, formed in a protruding shape on front and rear sides of the slatted mat 50 as viewed in a plan view, and is formed bendably or rollable toward a longitudinal direction.

A sheet-shaped food placing portion 53 is formed into a rectangular shape as viewed in a plan view in a state where the sheet-shaped food placing portion 53 occupies an area of a most portion of the slatted mat placing portion 40 of the base plate. The shape of the sheet-shaped food placing portion 53 is substantially the same as the shape of the sheet-shaped food placing portion 53 as viewed in a plan view, and has a lateral width of 100 to 105 mm, and a longitudinal length of 200 to 205 mm.

In a case where the slatted mat 50 is extended on the slatted mat placing portion 40, the sheet-shaped food placing portion 53 is horizontally developed on the upper surface 21 of the base plate 20, and an upper surface of the sheet-shaped food placing portion 53 functions as a lower molding surface 21a that is horizontal in plane with the upper surface 21 of the base plate 20.

As shown in FIG. 2, when the slatted mat 50 is extended to the slatted mat placing portion 40 and is placed on the slatted mat placing portion 40, the front and rear side hand gripping portions 54, 55 are exposed at the front and rear notched portions 22, 23 of the base plate 20, and function as gripping portions that an operator grips with his/her hands from above and below.

The slatted mat 50 is a mat-shaped cooking instrument that is placed below a food and is used for molding the food by rolling the food into a rolled shape or by molding the food in a folded shape by folding the food. The slatted mat 50 is formed bendable and foldable in a desired direction by connecting a plurality of bamboo slats having the same length to each other using strings.

The slatted mat 50 is not limited to the particular raw material and the particular structure provided that the sheet-shaped cooked rice r3 can be placed on the slatted mat 50 and the slatted mat 50 can be folded or rolled in a desired direction as it is. For example, the slatted mat 50 may be made of natural bamboo slats or may be synthetic resin made slats having flexibility. Further, the thickness of the slatted mat 50 is determined in conformity with the thickness of the above-mentioned slatted mat placing portion 40 (slatted mat placing stepped portions 41, 41'). For example, the thickness of the slatted mat 50 is 3 mm to 7 mm.

As described above, the slatted mat placing portion 40 and the slatted mat 50 are configured to engage with each other by fitting engagement by means of the left and right slatted mat placing stepped portions 41, 41' having a U shape as viewed in a plan view that are formed on the base plate 20 in a protruding manner.

A molding frame fitting engagement portion 60 is formed of: the slatted mat placing stepped portions 41, 41' on which the molding frame 10 is placed; and the frame mounting stepped portions 61, 61' that protrude upward so as to allow the fitting engagement of the molding frame 10 along the outer shape of the molding frame 10 at the position above the slatted mat placing stepped portions 41, 41'.

Inner side surfaces 61b of the frame mounting stepped portions 61, 61' oppositely face the outer side surface of the molding frame 10, and function as restricting surfaces that restrict the frontward, rearward, leftward and rightward movement of the molding frame 10.

It is sufficient that the frame mounting stepped portions 61, 61' are brought into contact with and engage with the respective four outer side portions of the molding frame 10 at the position above the slatted mat placing portion 40 in a state where the molding frame 10 is in a fitting engagement state with the frame mounting stepped portions 61, 61' so as to restrict the leftward, rightward, frontward, and rearward movement of the molding frame 10. In this embodiment, the frame mounting stepped portions 61, 61' are formed in a narrow elongated approximately U shape that is larger than the shape of the slatted mat placing stepped portions 41, 41' but has the approximately similar shape as the shape of the slatted mat placing stepped portions 41, 41' as viewed in a plan view.

The frame mounting stepped portions 61, 61' are formed so as to surround the slatted mat placing stepped portions 41, 41' from the outside and an open side having a U shape faces the inside of the base plate 20. The frame mounting stepped portions 61, 61' are arranged in line symmetry with respect to a left-right center line C of the base plate 20. The frame mounting stepped portions 61, 61' protrude in an upwardly protruding shape from the upper surface 21 of the base plate 20 along the left and right ends of the left and right end edges and the front and rear end edges of the upper surface 21 of the base plate 20.

In the same manner as the slatted mat placing stepped portions 41, 41', the frame mounting stepped portions 61, 61' are each formed of: a center long side wall portion 62 having an elongated rectangular rod shape that corresponds to a longitudinal side of a U shape as viewed in a plan view and extends in the front-rear direction along left and right edge portions of the base plate 20; and a front side short-side wall portions 63, 63' and a rear side short-side wall portions 64, 64' correspond to upper and lower sides of a U shape and form a short rectangular plate shape that is bent at a right angle and extends at a corner portion of the base plate 20 at front and rear ends of the center long side wall portion 62.

In the frame mounting stepped portions 61, 61', upper surfaces 61a, 61a' form horizontal flat surfaces that are set parallel to the upper surface 21 of the base plate 20, and inner side surfaces 61b, 61b' form vertical flat surfaces that are orthogonal to the upper surfaces 61a, 61a'.

More specifically, upper surfaces 61a, 61a' of the frame mounting stepped portions 61, 61' are formed of horizontal flat surfaces that are coplanar with upper surfaces of center long side wall portions 62, 62' and upper surfaces of front and rear side short side wall portions 63, 63', 64, 64'.

Inner side surfaces 61b, 61b' of the frame mounting stepped portions 61, 61' are formed as contact surfaces that make the inner side surfaces 61b, 61b' of the frame mounting stepped portions 61, 61' oppositely face the left and right outside surfaces of the molding frame 10 and make the inner side surfaces of the front and rear side short side wall portions 63, 64 oppositely face the front and rear outer side surfaces of the corner portion of the molding frame 10.

The oppositely facing surfaces of the front and rear side short side wall portions 63, 63', 64, 64' of the pair of frame mounting stepped portions 61, 61' are vertical surfaces coplanar with oppositely facing surfaces of the front and rear side short side wall portions 43, 43', 44, 44' of the slatted mat placing stepped portions 41, 41' disposed at the position below the frame mounting stepped portions 61, 61', and the front and rear side notched portions 22, 23 are formed between the front and rear oppositely facing surfaces.

Out of the left and right stepped portions, the lower stepped portion components are set as the slatted mat placing stepped portions 41, 41', and the upper stepped portion components are set as the frame mounting stepped portions 61, 61', and the slatted mat placing portion 40 and the molding frame fitting engagement portion 60 are formed on an inner side by the respective opposedly facing stepped portions. The slatted mat 50 and the molding frame 10 sequentially engage with the base plate 20 having such a configuration by fitting engagement.

Figure 4:
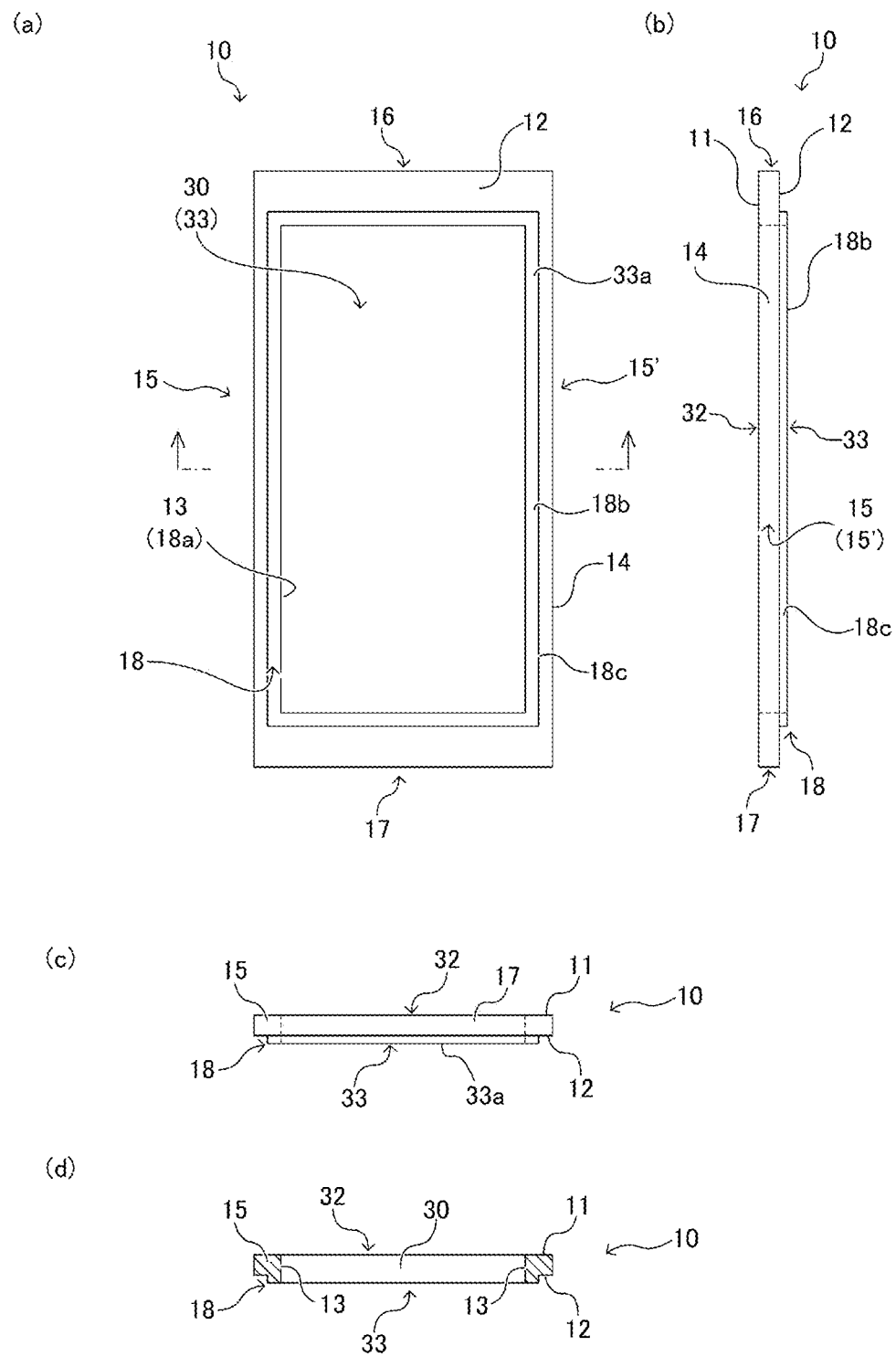
FIG. 4 is an explanatory view illustrating the configuration of a molding frame according to the first embodiment.

As illustrated in FIG. 4(*b*) to FIG. 4(*d*), the molding frame 10 is a flat plate body having a rectangular shape as viewed in a plan view. As illustrated in FIG. 4(*a*), the through window 30 having a rectangular shape as viewed in a plan view that is similar to the outer shape of the molding frame 10 is formed at a center portion of the molding frame 10 in a penetrating manner.

As illustrated in FIG. 4(*a*) to FIG. 4(*c*), the molding frame 10 includes: left and right side wall portions 15, 15' formed of an elongated rod having a rectangular cross section that extend in the front and rear direction; short plate front and rear side wall portions 16, 17 that has a short right angle rectangular shape and extend orthogonal to the extending direction of the left and right side wall portions 15, 15' so as to connect the front end portions of the left and right side wall portions 15, 15' and the rear end portions of the left and right side wall portions 15, 15' to each other.

In a case where the molding frame 10 is selected to conform to the shape of the sheet-shaped food S (sheet-shaped food placing portion 53 of the slatted mat 50), by placing the molding frame 10 along a periphery of the sheet-shaped food S, an exposed surface of the exposed sheet-shaped food 101 that closes the through window 30 by the cooked rice in the molding frame 10 from below, and the plate shaped cooked rice R3 can be formed using the exposed surface as the lower surface.

Figure 5:
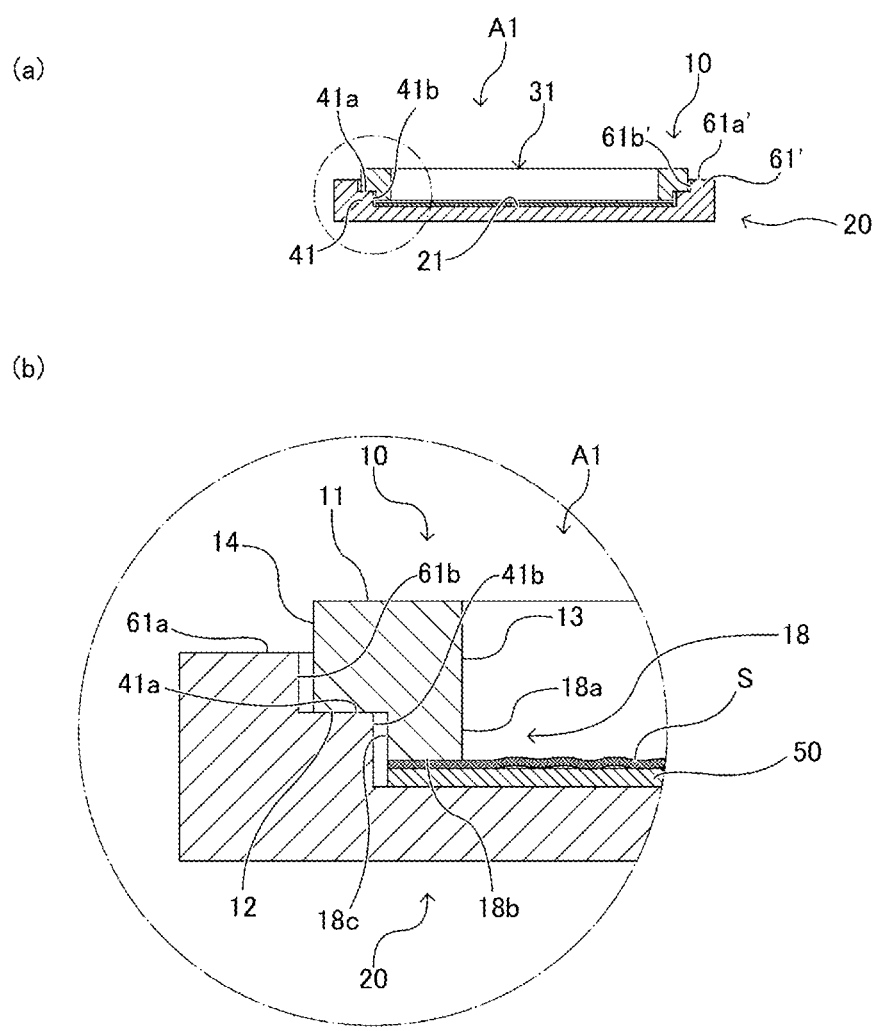
FIG. 5 is a schematic transverse cross-sectional view showing a state where the molding frame engages with the base plate by fitting in the first embodiment.

As illustrated in FIG. 2, FIG. 4 and FIG. 5, in the molding frame 10, in a state where the slatted mat 50 is mounted on the base mat mounting portion 40 and the molding frame 10 is mounted on the base plate 20, the slatted mat pressing protruding portion 18 that is brought into contact with and corresponds to the upper surface 51 of the slatted mat 50 is formed in a protruding manner downward from the lower opening edge 33*a* of the through window 30.

The slatted mat pressing protruding portion 18 is a protruding portion having an approximately rectangular annular shape as viewed in a bottom plan view that is formed in an endless manner such that the protruding portion 18 protrudes downward from downward from the lower surface 12 of the molding frame 10 fringes the lower opening edge 33*a* of the molding frame 10. The slatted mat pressing protruding portion 18 is formed on a lower surface 12 of the molding frame 10 in a downwardly protruding manner.

As illustrated in FIG. 4(*a*) to FIG. 5(*b*), an inner side surface 18*a* of the slatted mat pressing protruding portion 18 forms a vertical surface that is integral with the inner side surface 13 of the molding frame 10. Further, a lower end surface 18*b* of the slatted mat pressing protruding portion 18 is parallel in plane with the upper and lower surfaces 11, 12 of the molding frame 10, opposedly faces the upper surface 21 of the base plate 20 thus forming a flat pressure contact surface that downwardly presses the upper surface of the slatted mat 50 (sheet-shaped food S). An outer side surface 18*c* of the slatted mat pressing protruding portion 18 opposedly faces inner side surfaces 41*b*, 41*b*' of the slatted mat placing stepped portions 41, 41' and forms a flat engaging surface that is brought into contact with and engages with the slatted mat placing stepped portions 41, 41' in fitting engagement.

As described above, the lower surface 18*b* of the molded frame 10 having a frame shape presses the rectangular peripheral edge portion of the sheet-shape food S that is disposed in an overlapping manner (is stored) in the base plate 20. In FIG. 5, numeral 18 indicates a slatted mat pressing protruding portion that is a frame body of the molding frame 10 and is provided for pressing the peripheral edge portion of the slatted mat 50.

With such a configuration, as illustrated in FIG. 5(*b*), it is possible to close with certainty a gap formed between the lower surface 12 of the molding frame 10 and the upper surface 51 of the slatted mat 50. Accordingly, it is possible to prevent cooked rice from unexpectedly leaking out from a lower end edge portion at the time of performing an operation of spreading the cooked rice by leveling in the cooked rice storing space and hence, it is possible to manufacture plate-shaped cooked rice having favorably moldability where lower corner portions are neatly molded. Further, the slatted mat pressing protruding portion 18 of the molding frame 10 engages with the slatted mat placing portion 40 of the base plate 20 by fitting engagement and hence, it is possible to prevent the unexpected positional displacement of the molding frame 10 on the base plate 20.

(3) Plate-Shaped Cooked Rice Molding Jig According to Second Embodiment

Figure 7:
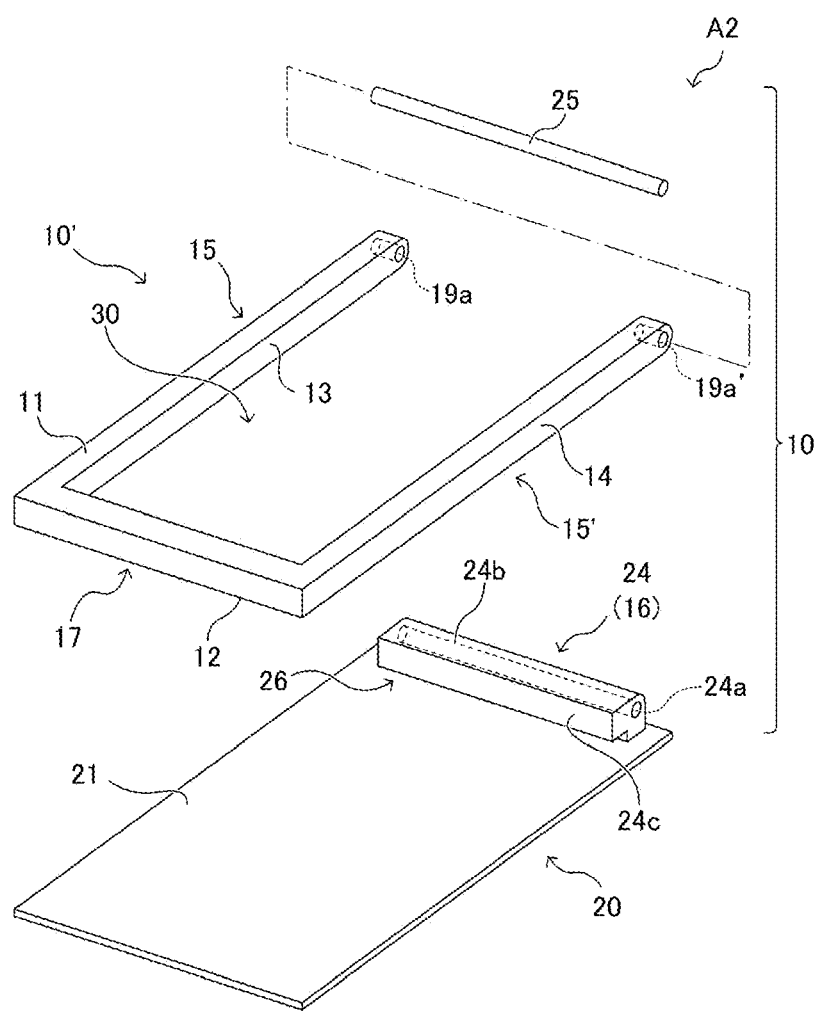
FIG. 7 is an exploded perspective view illustrating the configuration of the plate-shaped cooked rice molding jig according to the second embodiment.
Figure 8:
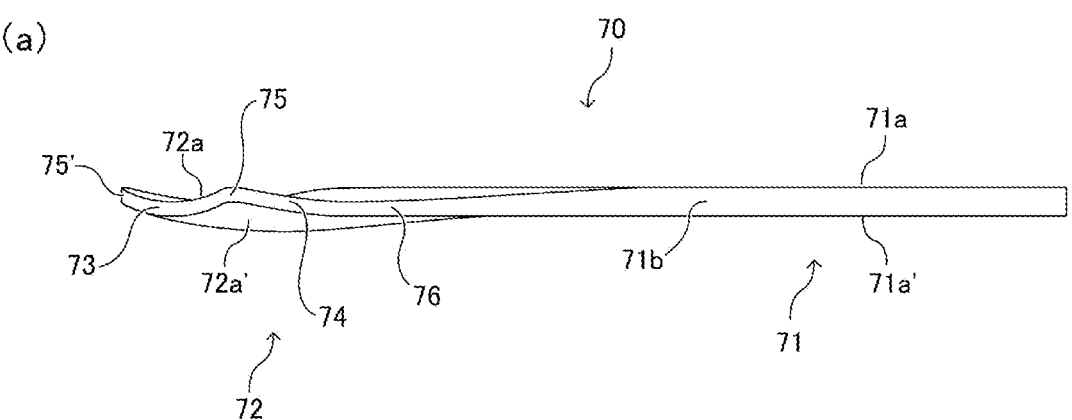
FIG. 8 is an explanatory view showing the configuration of a leveling spatula for leveling cooked rice used in the plate-shaped cooked rice molding jig according to the present invention.
Figure 8:
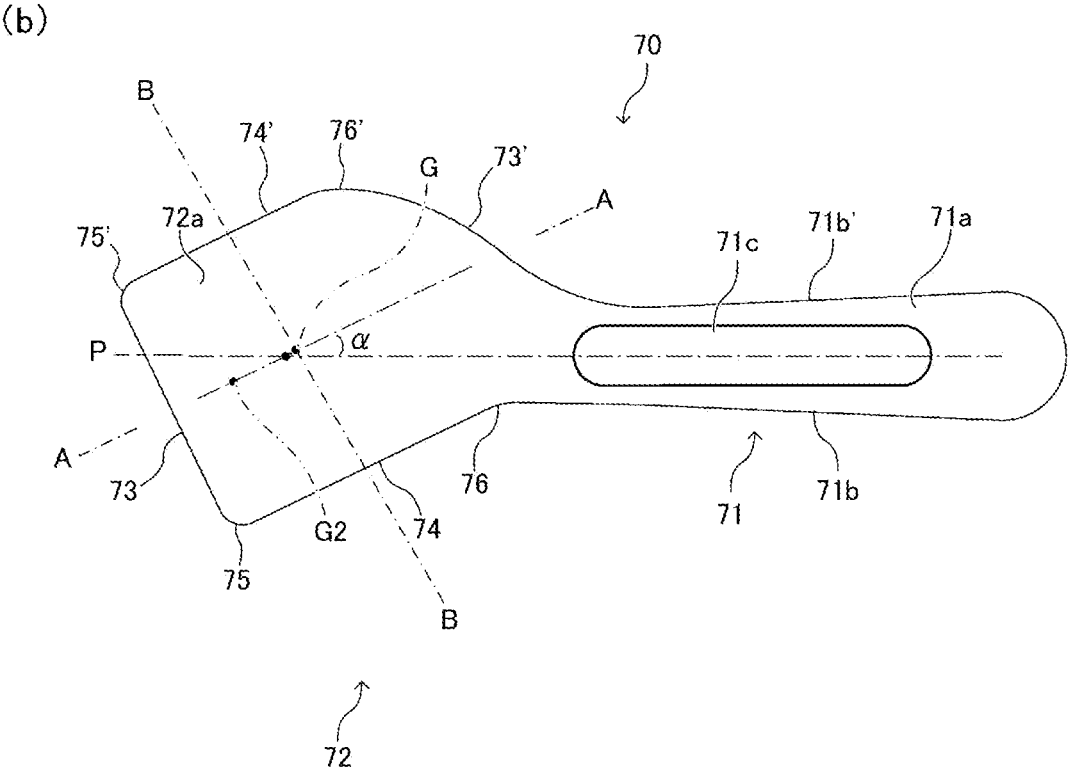
Figure 9:
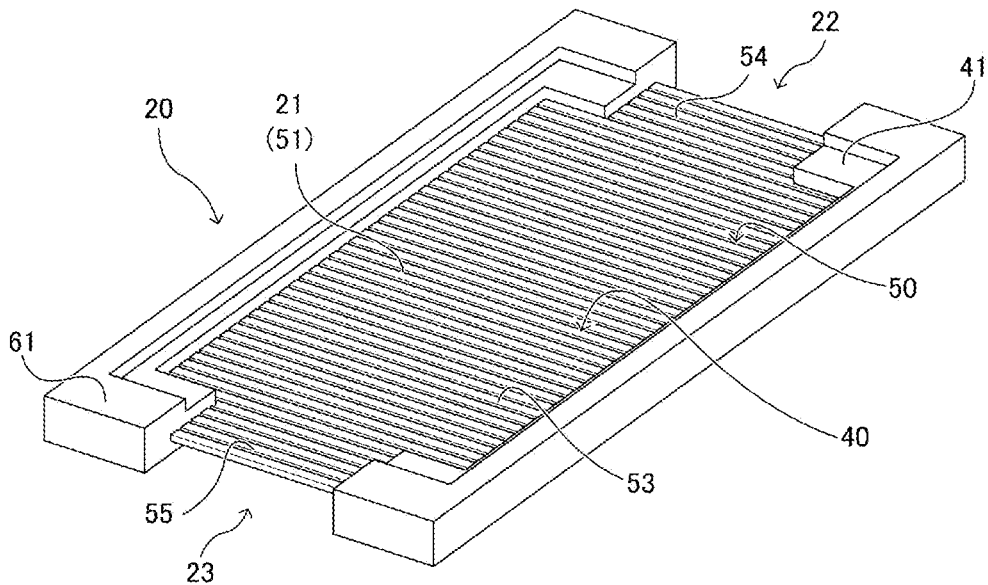
FIG. 9 is a schematic perspective view illustrating a use state of the plate-shaped cooked rice molding jig according to the present invention.
Figure 9:
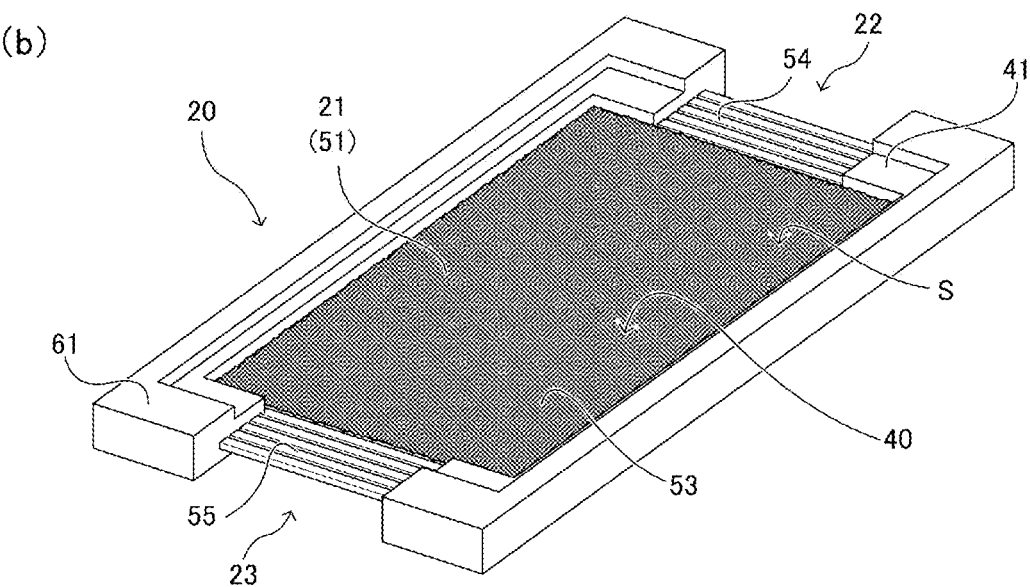
Figure 10:
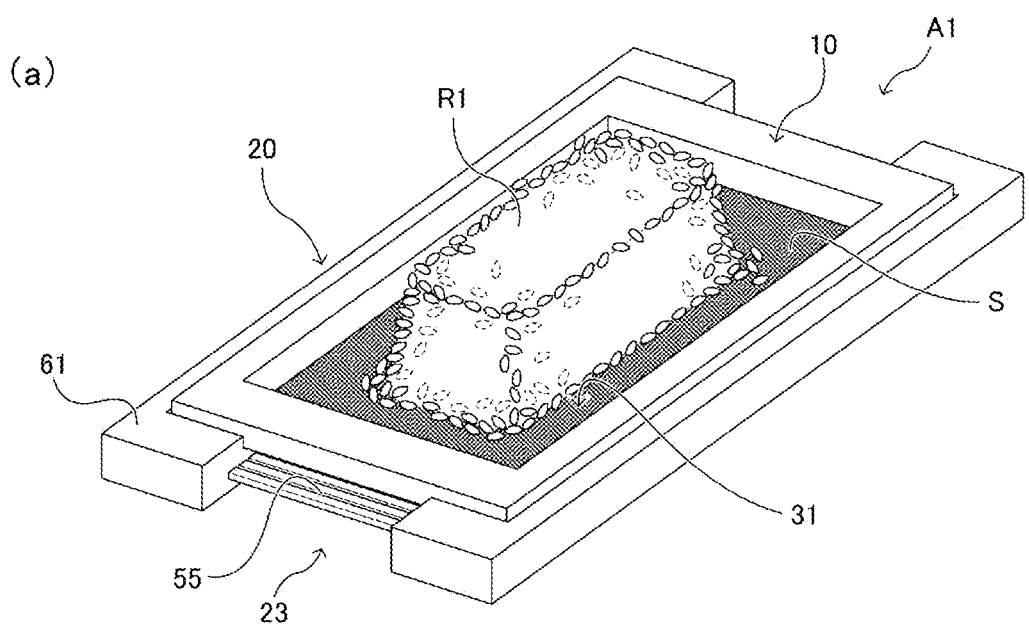
FIG. 10 is a schematic perspective view illustrating a use state of the plate-shaped cooked rice molding jig according to the present invention.
Figure 10:
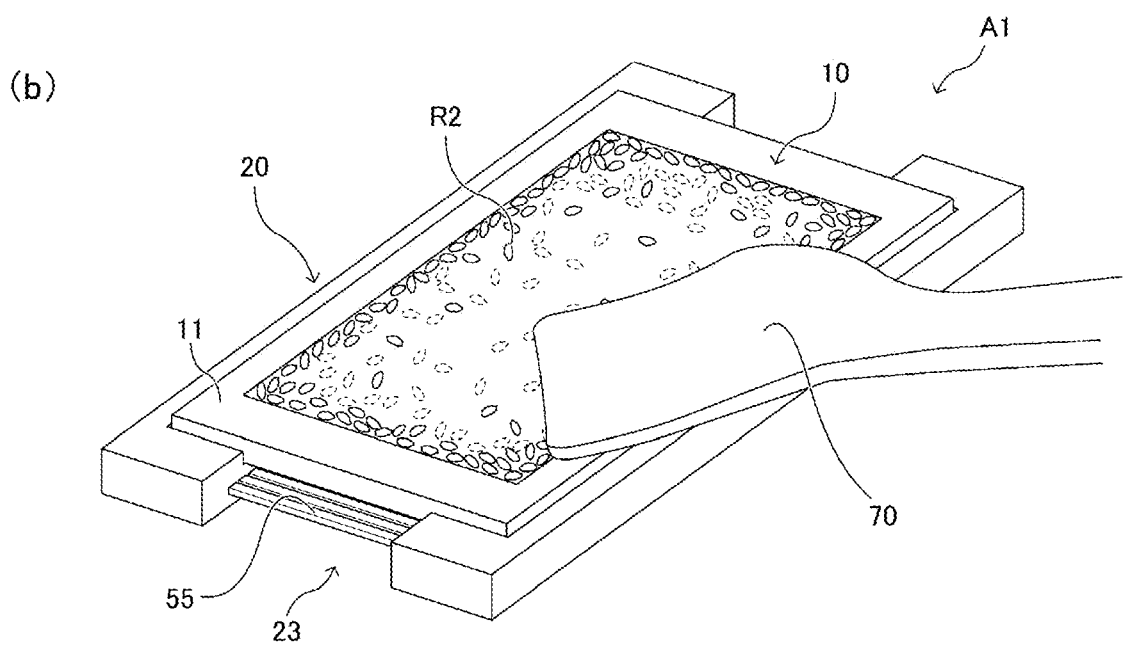
Figure 11:
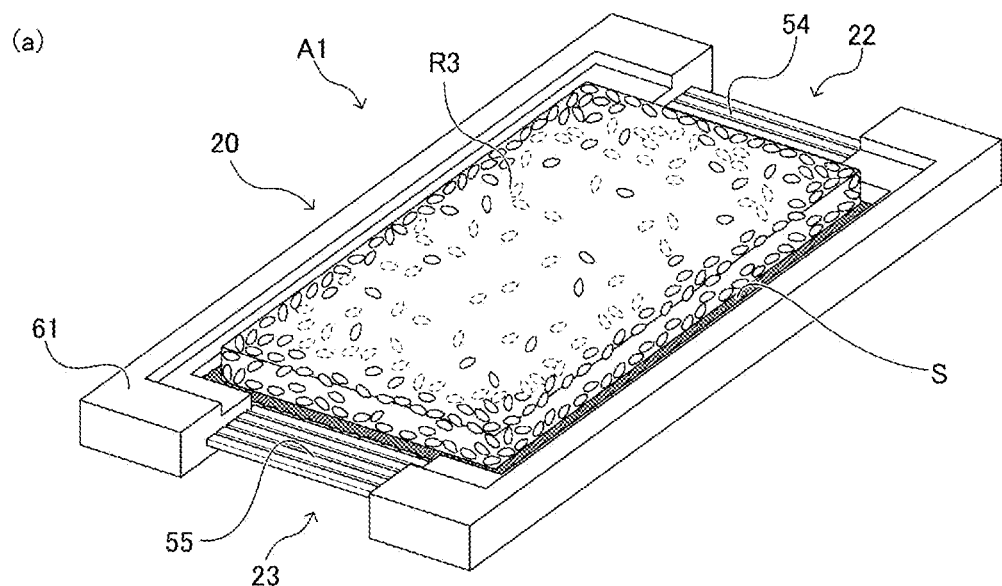
FIG. 11 is a schematic perspective view illustrating a use state of the plate-shaped cooked rice molding jig according to the present invention.
Figure 11:
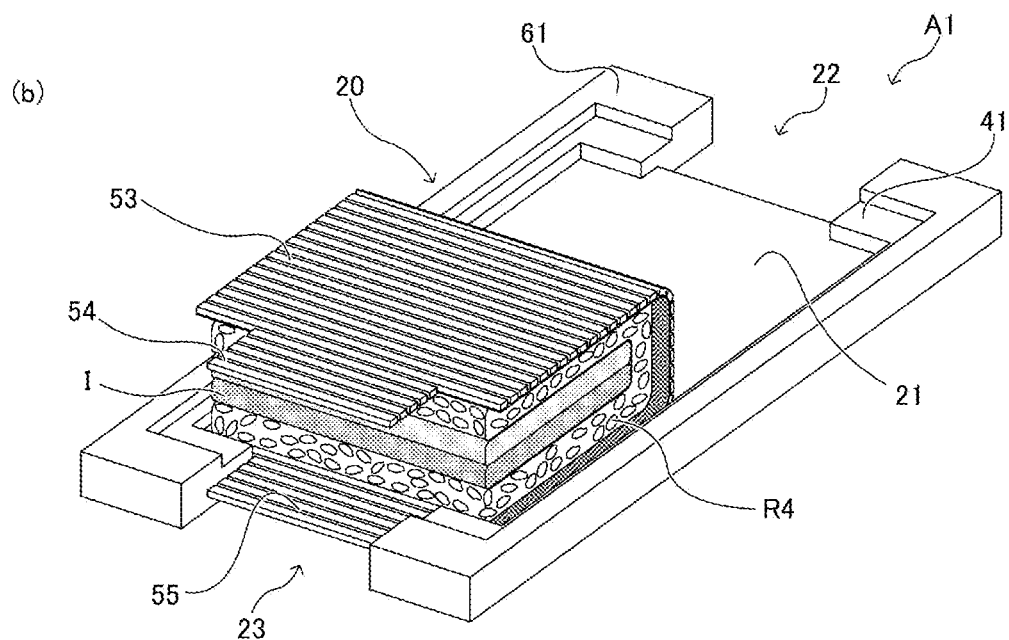

Next, the configuration of the plate-shaped cooked rice molding jig A2 according to the second embodiment is described. With respect to the constitutional elements identical to the corresponding constitutional elements of the plate-shaped cooked rice molding jig A1 according to the first embodiment, the same symbols are attached and the description of the constitutional elements is omitted. FIG. 7 and FIG. 8 are exploded perspective views illustrating the configuration of the plate-shaped cooked rice molding jig A2 according to the present embodiment.

The present jig A2 has substantially the same configuration as the plate-shaped cooked rice molding jig A1 according to the embodiment 1. However, the present jig A2 differs from the plate-shaped cooked rice molding jig A1 with respect to a point that a molding frame 10 is upwardly rotatably and pivotally supported on one end of the base plate 20.

That is, in the present jig A2, as illustrated in FIG. 7 and FIG. 8, bearing portions 24 protrude upwardly at one end of the base plate 20, and the molding frame 10 is rotatably and pivotally supported by the bearing portions 24.

Figure 6:
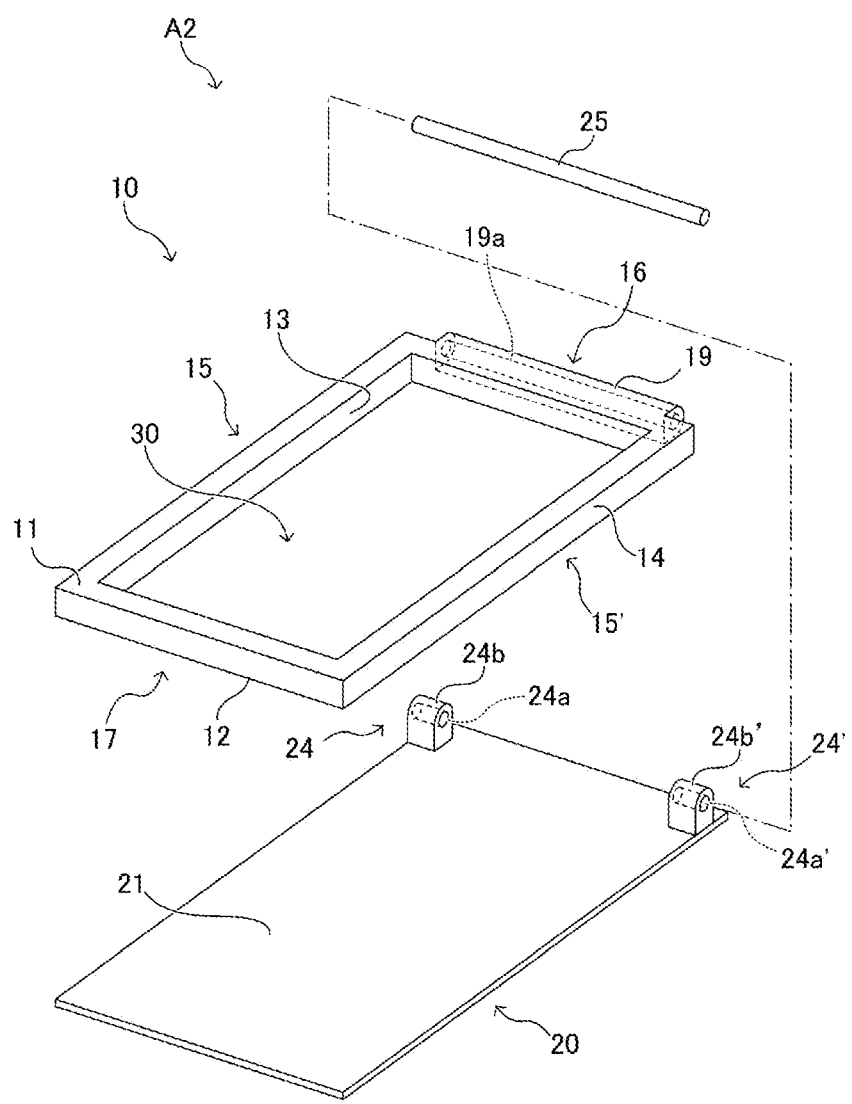
FIG. 6 is an exploded perspective view illustrating the configuration of a plate-shaped cooked rice molding jig according to a second embodiment.

In the present jig A2 illustrated in FIG. 6, two bearing portions 24, 24' are formed on left and right sides of one longitudinal end of the base plate 20, and the base plate 20 is upwardly and downwardly rotatably and pivotally supported by way of the pivot support shaft 25 in a state where one longitudinal end portion of the base plate 20 is fitted between the bearing portions 24, 24'.

Upper surfaces 24*b*, 24*b*' of the bearings 24, 24' are formed in a curved surface shape such that the upper surfaces 24*b*, 24*b*' of the bearings 24, 24' form a semicircular shape as viewed in an axial direction of the pivot support shaft 25. With such a configuration, about the pivot support shaft 25 disposed at a fixed position on the base plate 20, the molding frame 10 is upwardly rotatable from a collapsed posture state.

A front side wall portion 16 of the molding frame 10 are notched at outer corner portions on left and right sides as viewed in a plan view thus forming a bearing fitting engagement portion 19 on a front side. With such a configuration, the bearing fitting engagement portion 19 is disposed between the bearing portions 24, 24' in a fitting engagement manner.

Symbols 19a, 24a, 24a' indicate shaft holes.

The molding frame 10 is pivotally supported by the base plate 20 by way of the bearing portions 24, 24' by way of a pivot support shaft 25.

In the present jig A2 illustrated in FIG. 7, the molding frame 10 includes: bearing portions 24 laterally long angular rod shaped bearing portions 24 that are formed in an upwardly protruding manner at one longitudinal end of the base plate 20; and a frame body 10' having an approximately U shape as viewed in a plan view where left and right front end portions fit on left and right front end portions from the outside and upwardly and downwardly rotatably and pivotally supported by the bearings 24.

An upper surface 24b of the bearing portion 24 forms a flat surface, and an inner side surface 24c forms a vertical surface orthogonal to the upper surface 24b. The bearing portions 24 are disposed in a lying state at the center of one end portion of the base plate 20 and are formed in an upwardly protruding manner. The bearing portion 24 has an inverse L shape as viewed in a side view where an L-shaped end side distal end faces the inside, and a slatted mat inserting groove 26 is formed by recessing an inner side proximal portion toward the inside.

A frame body 10' is formed of left and right side wall portions 15, 15' and a rear side wall portion 17 while eliminating a front side wall portion 16 from the molding frame 10. That is, the molding frame 10 is formed by pivotally connecting the frame body 10' and the bearing portion 24 of the base plate 20 that also functions as the front side wall portion 16 of the molding frame 10 to each other by a shaft. A through window 30 is formed inside the frame body 10' by an inner side surface of the frame body 10' and an inner side surface of the bearing 24.

In this manner, in the present jig A2, the molding frame 10 is upwardly and downwardly rotatably and pivotally supported by the base plate 20 by way of the pivot shaft 25 at one end of the base plate 20, the present jig A2 takes a collapsed posture where a lower surface 12 of the molding frame 10 is made parallel in plane with an upper surface 21 of the base plate 20, and in the collapsed posture, a lower opening edge 33a of the through window 30 formed in the molding frame 10 is closed by an upper surface 21 of the base plate 20 thus forming a cooked rice storing space 31.

(4) Leveling Spatula Used in Plate-Shaped Cooked Rice Molding Jig According to the Present Invention Next, the configuration of the leveling spatula for leveling cooked rice stored in the cooked rice storing space of the present jig is described. FIG. 8(a) and FIG. 8(b) are a side view and a plan view illustrating the configuration of the leveling spatula. As illustrated in FIG. 8(a) and FIG. 8(b), the leveling spatula 70 includes: a grip portion 71; and a spatula body portion 72 having a flat shape that extends from one side of the grip portion 71. The leveling spatula 70 is used for leveling cooked rice stored in the cooked rice storing space 31 by a bottom surface of the spatula body portion 72.

The grip portion 71 formed into a flat narrow elongated shape having a desired width so as to enable an operator to easily grip the grip portion 71. The grip portion 71 is configured such that a width is gradually narrowed from a proximal end to a distal end, and a distal end portion of the grip portion 71 is formed into a curved shape between a portion of grip portion 71 on a proximal end side and the spatula body portion 72 so that a force is easily naturally applied to cooked rice when an operator manually operates the leveling spatula 70.

The grip portion 71 is formed in an arcuate shape in transverse cross section. To be more specific, the grip portion 71 is configured such that a recessed portion 71c is formed on an upper surface 71a of the grip portion 71 in an elongated hole shape along an axial direction of the grip portion 71 for allowing a ball of a finger to be brought into contact with and be placed in the recessed portion 71c, and lower surface 71a' is formed in a curved protruding surface along an axial direction of the grip portion 71 in a state where the lower surface 71a' is continuously formed with left and right outside portions 71b, 71b'.

As illustrated in FIG. 8(b), the spatula body portion 72 is a portion having a flat plate shape. A lower surface 72a' of the spatula body portion 72 forms a contact surface with cooked rice R1 and the surface 11 of the molding frame 10 of the present jig. The spatula body portion 72 is connected to the grip portion 71 in an inclined manner with respect to an imaginary axis line P of the grip portion 71.

The spatula body portion 72 includes, as edge portions that define an approximately rectangular shape as viewed in a plan view: a distal end edge portion 73 that is disposed on a distal end side and extends in a straight line; a proximal end edge portion 73' that extends in a curved shape such that the proximal end edge portion 73' gradually bulges toward the outside from one side of the grip portion 71; and left and right end edge portions 74, 74' that extend in a straight line between both ends of the distal end portion 73.

The spatula body portion 72 is formed such that a length of left and right end edge portions 74, 74' is set to at least a length that is ½ or more of a longitudinal length of the cooked rice storing space 31. Further, in the spatula body portion 72, out of four corner portions 75, 75', 76, 76' of the rectangular shape as viewed in a plan view, one corner portion or a portion in the vicinity of one corner portion is formed as a connection portion with the grip portion 71, and the center of gravity G of the spatula body portion 72 is disposed on an imaginary axis line P of the grip portion 71 or in the vicinity of the imaginary axis line P.

That is, the spatula body portion 72 is connected to the grip portion 71 such that the spatula body portion 72 is disposed at a relative portion at which the rear left side corner portion 76 and the front right side corner portion 75' that is disposed diagonal to the rear left side corner portion 76 are arranged in an approximately line symmetry with respect to the center of gravity of the spatula body portion 72, and the center of gravity G of the spatula body portion 72 is disposed at the position in the vicinity of the imaginary axis line P of the grip portion 71.

The spatula body portion 72 is connected to the grip portion 71 in a state where the distal end edge portion 73 is inclined with respect to the imaginary axis line P of the grip portion 71. That is, the leveling spatula 70 has, in the spatula body portion 72 having an approximately rectangular shape as viewed in a plan view, a pair of left and right end edge portions 74, 74 that are parallel to each other on both sides of the spatula body portion 72 with the imaginary axis line P of the grip portion 71 sandwiched therebetween.

In other words, as illustrated in FIG. 8(a) and FIG. 8(b), the leveling spatula 70 is formed in an approximately L shape as viewed in a plan view such that the center of gravity G2 in a front half portion of the spatula body portion 72 is eccentrically disposed so that a main portion of the front half portion of the spatula body portion 72 is disposed on one side out of the left and right sides with respect to the imaginary axis line P of the grip portion 71.

An upper surface 72a of the spatula body portion 72 is formed into a curved recessed surface, and a lower surface 72a' of the spatula body portion 72 is formed into a curved protruding surface.

With such a configuration, the leveling spatula 70 can finely adjust a contact area between the leveling spatula 70 and cooked rice R1 along the lower surface 72a' of the spatula body portion 72 and hence, it is possible to accurately perform an operation of spreading cooked rice R1 by leveling while adjusting a leveling amount of cooked rice.

(5) Use Example of Plate-Shaped Cooked Rice Molding Jig According to the Present Invention Next, the use example of the plate-shaped cooked rice molding jig according to the present invention is described. Hereinafter, the use example of above-mentioned leveling spatula 70 and the plate-shaped cooked rice molding jig A1 according to the first embodiment is described in detail. However, it is needless to say that plate-shaped cooked rice can be also manufactured using the pivot-axis-type plate-shaped cooked rice molding jig A2 according to the second embodiment.

First, as illustrated in FIG. 9(b), the slatted mat 50 is mounted on the base plate 20 by fitting engagement such that the slatted mat 50 is extended in the slatted mat placing portion 40 between the slatted mat placing stepped portions 41, 41.

Next, as illustrated in FIG. 9(b), the sheet-shaped food S is placed in a flatly spreading manner on the sheet-shaped food placing portion 53 of the slatted mat 50. An upper surface of the sheet-shaped food S is made parallel in plane with the upper surface 51 of the slatted mat 50, that is, the upper surface 21 of the base plate 20 in a state where the sheet-shaped food S is fitted in a rectangular portion of the slatted mat placing portion 40 as viewed in a plan view.

Next, as illustrated in FIG. 10(a), the molding frame 10 is made to engage with the molding frame fitting engagement portion 60 of the base plate 20 by fitting engagement. In a state where the molding frame 10 is made to engage with the molding frame fitting engagement portion 60, the outer bottom side edge portion of the lower surface 12 of the molding frame 10 is brought into fact contact with the upper surfaces 41a, 41a' of the slatted mat placing stepped portions 41, 41', and the outer side surfaces 14 of the molding frame 10 are made to opposedly face the inner side surfaces 61b, 61b' of the frame mounting stepped portions 61, 61', and the molding frame 10 is disposed on the base plate 20 at the position above the slatted mat 50.

In molding the molded cooked rice lump R2, as illustrated in FIG. 10(a), a predetermined amount of cooked rice R1 is placed on the sheet-shaped food S exposed in the cooked rice storing space 31. The cooked rice R1 is formed into a lump having an approximately rectangular parallelepiped shape by being stored in a container such as a food storage container having the same capacity as the capacity of the cooked rice storing space 31.

The cooked rice R1 is disposed at the center of an upper surface of the sheet-shaped food S such that four corner portions of the cooked rice R1 correspond to respective corner portions of the cooked rice storing space 31, the cooked rice R1 is placed on diagonal lines of the cooked rice storing space 31, and an intersecting point of the diagonal lines of the cooked rice R1 is disposed on an intersection point between diagonal lines of the cooked rice storing space 31.

Next, the cooked rice R1 is spread by leveling using the leveling spatula 70 such that the cooked rice storing space 31 is filled with the cooked rice R1 without forming any gap. In such an operation, the lower surface 51' having a curved protruding shape of the spatula body portion 72 of the leveling spatula 70 is made approximately parallel to the upper surface 11 of the molding frame 10, is brought into contact with the cooked rice R1 disposed at the center of the cooked rice storing space 31, and spreads the cooked rice R1 by leveling while pressing the cooked rice R1 downward.

When the cooked rice R1 is spread by leveling to the position in the vicinity of the inner side surface of the molding frame 10, as illustrated in FIG. 10(b), an operator makes the lower surface 51' of the slatted mat body portion 72 slide on the upper surface 11 of the molding frame 10 and presses the cooked rice R1 downward so that the thickness of the cooked rice becomes the same as the thickness of the molding frame 10.

Particularly, the slatted mat press contact protruding portion 18 of the molding frame 10 is brought into pressure contact with the sheet-shaped food S placed on the slatted mat 50 along the periphery of the sheet-shaped food S and hence, there is no possibility that the cooked rice R1 unexpectedly sticks out from the sheet-shaped food S when the cooked rice R1 is spread by leveling. As a result, it is possible to mold the plate-shaped molded cooked rice lump R2 that traces the outer shape of the sheet-shaped food S as viewed in a plan view, that is, the plate-shaped cooked rice R3.

As has been described above, a "spreading-by-leveling molding" operation for molding the molded cooked rice lump R2 that is integrally formed with the sheet-shaped food S that has the same thickness as the molding frame 10 and has the same shape as the cooked rice storing space 31 on a lower bottom surface can be performed by the simple steps that the respective corner portions of the flat square shape of the spatula body portion 72 are made to correspond to the respective corner portions of the cooked rice storing space 31 of the molding frame 10, the cooked rice is placed on the lower molding surface of the base plate and is stored in the rice storing space 31, and the cooked rice is spread by leveling over the entire region in the cooked rice storing space 31 while downwardly pressing the spatula body portion 72 or the like so as to bring the spatula body portion 72 or the like into contact with the side molding surface of the molding frame.

Next, "a mold removing operation" is performed for molding and manufacturing the plate-shaped cooked rice R3 on the base plate 20 by performing upward removing steps for removing the molding frame 10. As a result, as illustrated in FIG. 11(a), on the slatted mat 50 on the base plate 20, the plated cooked rice R3 that is formed by integrating the lower bottom surface of the plated cooked rice R3 with the sheet-shaped food S can be molded.

Figure 13:
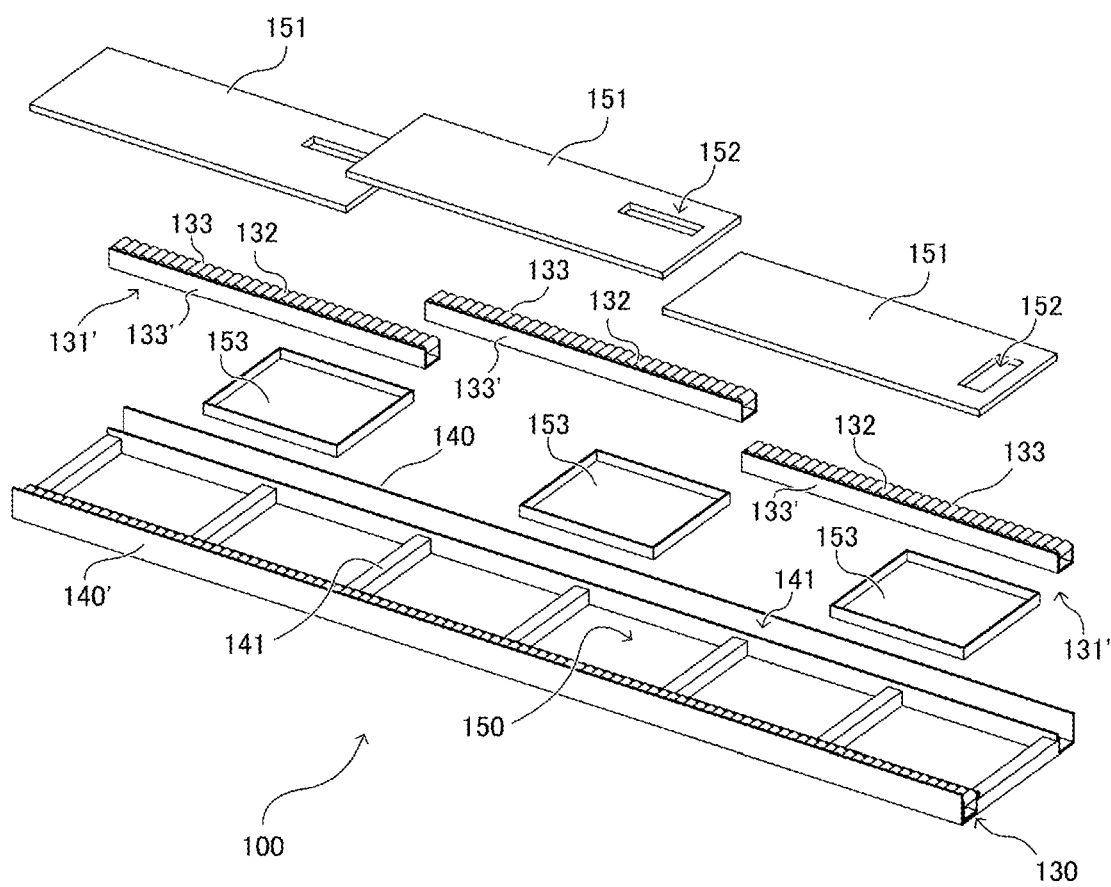
FIG. 13 is a partially enlarged perspective view of the plate-shaped cooked rice manufacturing device provided with the plate-shaped cooked rice molding jig according to the present invention.
Figure 14:
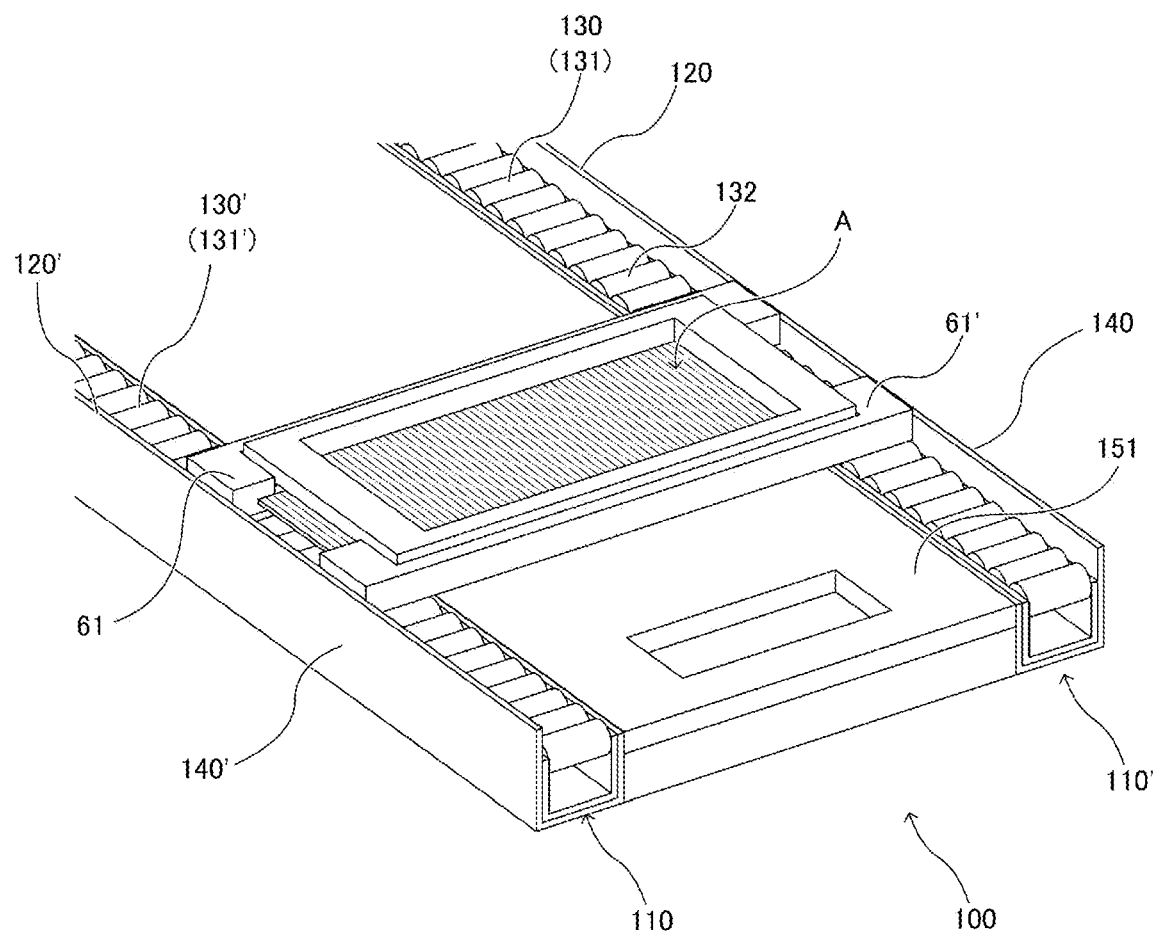
FIG. 14 is a partially enlarged perspective view of the plate-shaped cooked rice manufacturing device provided with the plate-shaped cooked rice molding jig according to the present invention.
Figure 15:
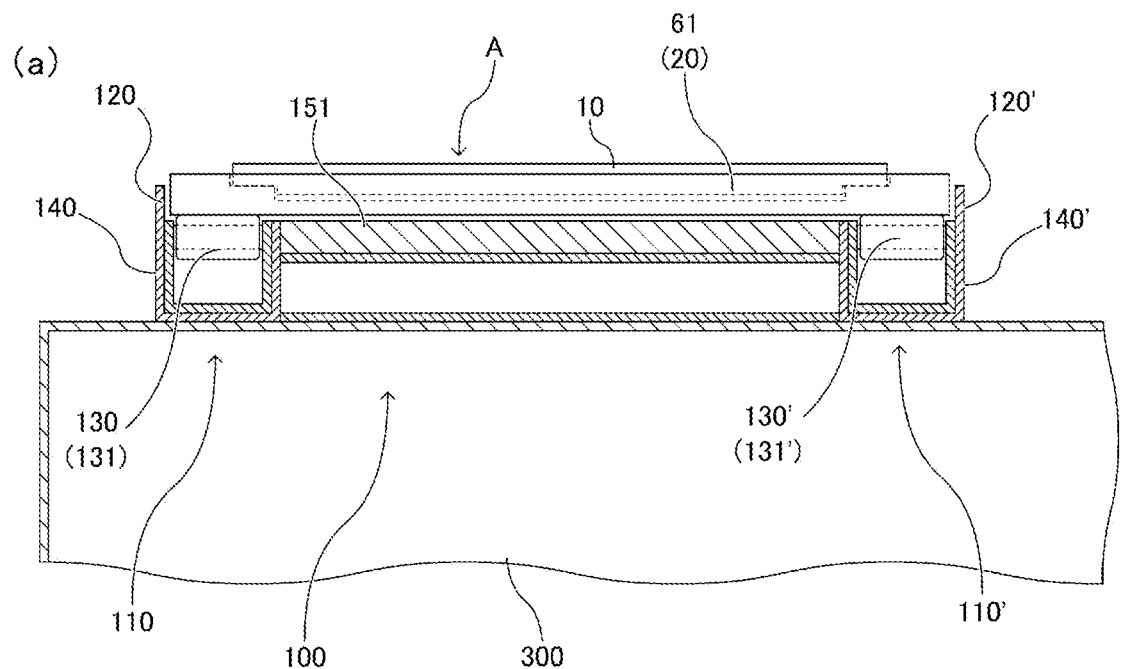
FIG. 15 is a schematic partially enlarged cross-sectional view illustrating the configuration of the plate-shaped cooked rice manufacturing device provided with the plate-shaped cooked rice molding jig according to the present invention.
Figure 15:
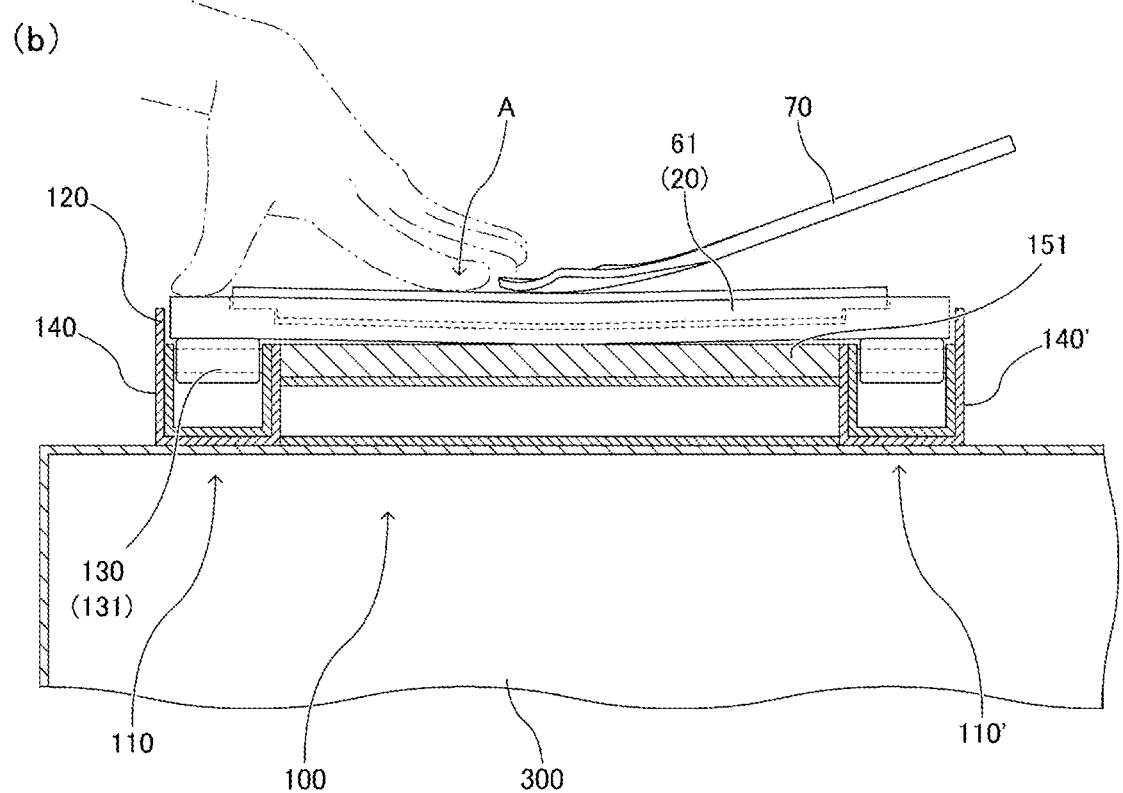

(6) Plate-Shaped Cooked Rice Manufacturing Device Provided with Plate-Shaped Cooked Rice Molding Jig According to the Present Invention Next, the configuration of the plate-shaped cooked rice manufacturing device provided with plate-shaped cooked rice molding jig according to the present invention is described with reference to attached drawings. FIG. 12 is an overall perspective view illustrating the configuration of the plate-shaped cooked rice manufacturing device, FIG. 13 is a partially enlarged perspective view illustrating the configuration of the plate-shaped cooked rice manufacturing device, FIG. 14 is a partially enlarged perspective view illustrating the configuration of the plate-shaped cooked rice manufacturing device, and FIG. 15 is a schematic partially enlarged transverse cross-sectional view illustrating the configuration of the plate-shaped cooked rice manufacturing device.

As illustrated in FIG. 12, the plate-shaped cooked rice manufacturing device B according to the present invention includes: a conveyance unit 100 for conveying the plate-shaped cooked rice molding jig A1 according to the first embodiment and the plate-shaped cooked rice molding jig A2 according to the second embodiment (described hereinafter simply as the present jig A); and a cooked rice supply unit 200 that is disposed at a start end portion or a middle portion of the conveyance unit 100 and discharges a predetermined amount of cooked rice to the inside of the plate-shaped cooked rice molding jig A from the position above the conveyance unit 100.

The conveyance unit 100 is disposed on a mounting base 300 having a predetermined height that allows an operator to perform an operation in a relaxed posture in a state where a conveyance surface forms a horizontal surface. The conveyance unit 100 is disposed on the mounting base 300 such that a height of the conveyance unit 100 from a floor surface to the conveyance surface is set to approximately 80 cm to 90 cm by way of the mounting base 300.

The conveyance unit 100 functions, in the present jig A conveyed in a sliding manner, as an operation base for manufacturing the plate-shaped cooked rice R3 or the cooked rice food R4 by a single or a plurality of operators being arranged on one side in the direction orthogonal to the conveyance direction and in order from an upstream side to a downstream side in the conveyance direction as viewed in a plan view.

The length of the conveyance unit 100 is set to a length that enables a series of operation steps where at least two operators are positioned side by side, and manufacture the plate-shaped cooked rice R3 and a cooked rice food R4 from the supplied cooked rice R1 by way of the sequentially conveyed present jigs A. For example, the length of the conveyance unit 100 is 1.5 to 1.7 m. The width of the conveyance unit 100 is set equal to or greater than the longitudinal length of the present jig A. That is, the width of the conveyance unit 100 is set to a width that allows the sliding conveyance of the present jig A in the conveyance direction. For example, the width of the conveyance unit 100 is 250 mm to 290 mm.

The conveyance unit 100 has, on the mounting base 300, a pair of conveyance roller cases 110, 110' that is disposed parallel to each other while holding a predetermined distance therebetween. Both end portions of the present jig A are supported between the conveyance roller cases 110, 110' so that the present jig A can be conveyed in a sliding manner in the extending direction of the conveyance roller cases 110, 110'.

The pair of conveyance roller cases 110, 110' is installed parallel to each other while holding a predetermined distance therebetween in a state where respective L-shaped distal end portions, that is, respective lateral guide wall portions 130, 130' face each other inwardly such that L-shaped inner sides open upwardly, the guide longitudinal wall portions 120, 120' opposedly face each other.

At the time of conveying the present jig A, the outer side surfaces of the base plate 20 and front and rear outer side surfaces of the frame mounting stepped portions 61, 61 are brought into slide contact with inner side surfaces of the guide longitudinal wall portions 120, 120' and hence, the conveyance posture of the present jig A on the conveyance unit 100 can be made more stable.

As illustrated in FIG. 13, between the conveyance roller cases 110, 110', waste storing portions 150 for collecting an undesired waste that is produced in the manufacturing steps of the plate-shaped cooked rice R3 that is molded by way of the present jig A conveyed by the conveyance unit 100 and the reshaped cooked rice food R4 are formed at the position below the conveyance roller cases 110, 110'.

A lower opening of the waste storing portion 150 is substantially closed by an upper surface of the mounting base 300, and a shallow bottomed member 153 having an approximately same rectangular parallelepiped shape such as a bat is in the waste storing portion 150 in a fitting engagement manner.

An upper opening of the waste storing portion 150 is openable and closable by a lid body 151 formed of a flat plate having a rectangular shape as viewed in a plan view that straddles over partition walls 141 disposed adjacently to each other. In the lid body 151, a discard hole 152 that communicates with the waste storing portion 150 below the lid body 151 in a lid closed state is formed.

The lid body 151 is configured such that an upper surface of the lid body 151 is, as illustrated in FIG. 15(a), disposed at the position below the conveyance surface formed of guide lateral wall portions 130, 130' of the conveyance roller cases 110, 110'. When the conveyance roller cases 110, 110' straddle over the present jig A, a clearance that brings an outer bottom side surface of the present jig A in a non-contact state with the guide lateral wall portions 130, 130' is formed.

The conveyance portion 100 has the following configuration. That is, conveyance roller cases 110, 110' each having a rectangular U-shaped cross section in the transverse direction are disposed at a predetermined distance therebetween, and a large number of conveyance rollers 132, 132' that are transversely and pivotally supported by the conveyance roller cases 110, 110' are stored in the conveyance roller cases 110, 110' in a state where the conveyance rollers 132, 132' are disposed adjacently each other. On the conveyance rollers 132, 132', the base plate 20 above which the molding frame 10 is vertically disposed and on which the sheet-shaped food S is placed is mounted in a travelling-by-rolling manner so that the base plate 20 is travelable or can be conveyed on the conveyance roller cases 110, 110'. The roller conveyors 131, 131' that form the guide lateral wall portions 130, 130' may be configured as a plurality of units that extend in parallel in the longitudinal direction. In this case, each unit may have a length that allows an operator to easily hold and carry.

Conveyance frames 140, 140' are formed into a U shape that is opened upwardly as viewed in cross section, and conveyor fitting engagement grooves 141, 141' that engage with the roller conveyors 131, 131' in fitting engagement correspondingly form an elongated recessed shape along the extending direction of the conveyance frames 140, 140'.

The installing position of the cooked rice supply unit 200 is not particularly limited provided that the plate-shaped cooked rice R3 can be continuously manufactured by way of the present jig A. The cooked rice supply unit 200 may be installed at a middle portion of the conveyance unit 100. A stopper 400 that restricts the conveyance movement of the present jig A is disposed at a terminal portion of the conveyance unit 100, that is, at a most downstream side end portion of the conveyance unit 100 in the longitudinal direction.

The cooked rice supply unit 200 includes: a housing 240 having an approximately U shape as viewed in a side view; a hopper 210 mounted on an upper portion of the housing 240; a cooked rice conveyance unit 220 that is disposed in the housing 240 and connected to the hopper 210 in an interlocking manner below the hopper 210; a cooked rice discharge portion 230 that protrudes downwardly from an upper side protruding portion having a U shape of the housing 240, and make a cooked rice discharge opening 231 from which cooked rice fed from the cooked rice conveyance unit 220 face downward; and a jig mounting base 250 that forms a lower side protruding portion having a U shape of the housing 240 on a horizontal surface such that the lower side protruding portion oppositely face the cooked rice discharge opening 231.

It is sufficient that the cooked rice conveyance unit 220 can convey a desired amount of cooked rice by performing an adjustment control of an amount of cooked rice toward the cooked rice discharge portion 230 while loosening the cooked rice supplied from a lower portion of the hopper 210. For example, the cooked rice conveyance unit 220 may be formed of a screw that is rotationally driven by a motor, for example.

The jig mounting base 250 is positioned on a most upstream side of the conveyance unit 100 in the conveyance direction, that is, at a start end of the conveyance unit 100. The jig mounting base 250 has a horizontal mounting surface 251 that is continuously coplanar with a conveyance surface of the conveyance unit 100 such that the jig mounting base 250 is contiguously disposed with the conveyance unit 100.

In this manner, it is sufficient for the jig mounting base 250 that the jig mounting base 250 includes: a horizontal mounting surface 251 that is continuous with the conveyance surface of the conveyance unit 100; and the left and right side guide wall bodies that are continuous with the guide longitudinal wall portions 120, 120' of the conveyance unit 100. The jig mounting base 250 may be formed of an attachment that is detachably mounted on the cooked rice supply unit 200.

Operations of the hopper 210 and the cooked rice conveyance unit 220 can be controlled by a cooked rice supply control unit that is incorporated in the housing 240 as a separate body. In FIG. 1, symbol 260 indicates input switches that are mounted on a front surface of the cooked rice discharge portion 230 for setting inputs such as a holding temperature held by the hopper 210 for cooked rice, a discharge amount of cooked rice, cooked rice discharging timing.

The cooked rice supply unit 200 includes a discharge control means 270 that performs a control where a predetermined amount of cooked rice is discharged to the center of an upper surface of the jig from the cooked rice discharge opening 231 at timing that the present jig A that is sequentially conveyed by the conveyance unit 100 passes the position just below the cooked rice discharge portion 230.

The discharge control means 270 is connected to the cooked rice supply control unit. In the discharge control means 270, a pair of passing detection sensors 271, 271' that detect timing at which the present jig A that is sequentially conveyed by the conveyance unit 100 has passed the position just below the cooked rice discharge portion 230 are disposed at a predetermined position on the jig mounting base 250, for example, the position in the vicinity of the left and right side guide wall bodies. As the passing detection sensors 271, 271', an infrared sensor, a load cell and the like can be adopted, for example.

Figure 16:
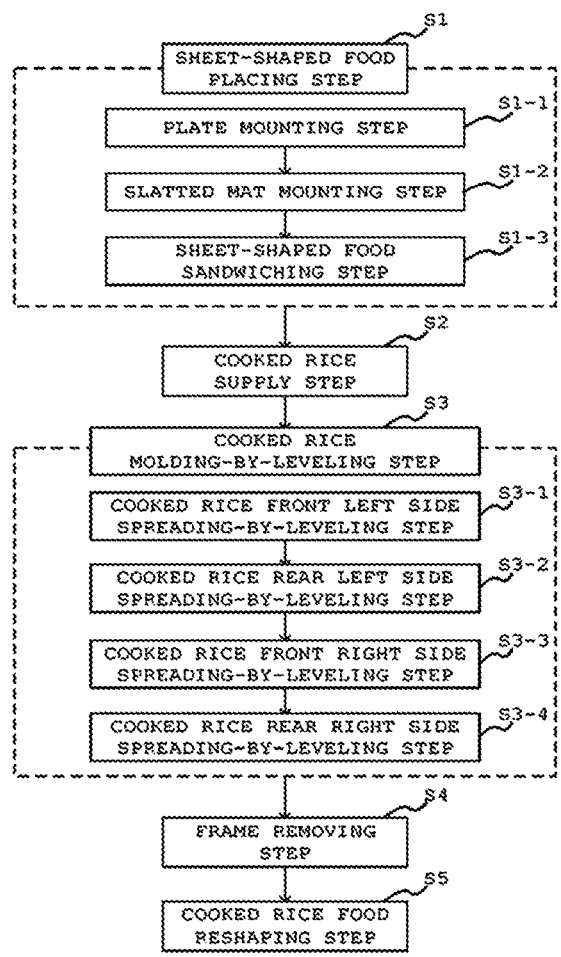
FIG. 16 is a flowchart illustrating manufacturing steps using the plate-shaped cooked rice manufacturing device provided with the plate-shaped cooked rice molding jig according to the present invention.

(7) Use Example of Plate-Shaped Cooked Rice Manufacturing Device Provided with Plate-Shaped Cooked Rice Molding Jig According to the Present Invention Next, the use example of the plate-shaped cooked rice manufacturing device is described. The plate-shaped cooked rice R3 is manufactured by carrying out the plate-shaped cooked rice manufacturing method that includes at least four various steps S1 to S4 in accordance with (5) Use example of the plate-shaped cooked rice molding jig according to the present invention using the present device B. FIG. 16 is a flowchart illustrating the plate-shaped cooked rice manufacturing method.

[Step 1: Sheet-Shaped Food Placing Step]

The sheet-shaped food placing step S1 is a step where the slatted mat 50 and the sheet-shaped food S are mounted between the base plate 20 and the molding frame 10 of the present jig A at the start end side of the conveyance unit 100. This step includes the following three steps.

[Step S1-1]

The step S1-1 is a plate mounting step where an operator who is positioned at a most upstream side of the conveyance unit 100 mounts the base plate 20 on the conveyance unit 100.

[Step S1-2]

Step S1-2 is a slatted mat mounting step S1-2 where the slatted mat 50 is placed on the slatted mat placing portion 40 formed between them.

[Step S1-3]

Step S1-3 is a sheet-shaped food sandwiching step where the sheet-shaped food S is placed on the slatted mat 50 that is placed on the slatted mat placing portion 40 and, further, the molding frame 10 is mounted on the sheet-shaped food S from above the sheet-shaped food S thus sandwiching the sheet-shaped food S between the molding frame 10 and the base plate 20.

By performing this sheet-shaped sandwiching step S1-3, the through window 30 is covered by the base plate 20 from below thus forming the cooked rice storing space 31 in which the cooked rice R1 is stored.

[Step 2: Cooked Rice Supply Step]

The cooked rice supply step S2 is a step where a predetermined amount of cooked rice R1 is discharged and supplied to the cooked rice storing space 31 of the present jig A from the cooked rice supply unit 200. The shape of the cooked rice R1 supplied by the cooked rice supply step S2 may be an indeterminate shape in a loosed state or a pre-molded determinate shape such as a cubic shape as described in FIG. 10(a).

The present jig A on which the slatted mat 50 and the sheet-shaped food S are placed in sheet-shaped food sandwiching step S1 is moved by sliding toward the cooked rice supply unit 200 disposed at the most upstream side of the conveyance unit 100. A predetermined amount of cooked rice is R1 is discharged and supplied to the present jig A from the cooked rice discharge portion 230 of the cooked rice supply unit 200 at timing that the present jig A is mounted on the jig mounting base 250.

It is needless to say that the cooked rice supply step S2 can be manually performed by an operator in step S1 or an operator positioned on a downstream side of the previous operator without using the cooked rice supply unit 200. That is, a plurality of cooked rice R1 the weight of which are measured in advance and are stored in respective containers may be prepared, and these cooked rice R1 may be manually and sequentially supplied to the cooked rice storing space 31 of the present jig A that is conveyed through step S1 from these containers.

[Step S3: Cooked Rice Molding-by-Leveling Step]

Cooked rice molding-by-leveling step S3 is a step where the cooked rice R1 that is supplied to the inside of the present jig A is spread by leveling in the entire region of the cooked rice storing space 31 such that the upper surface of the cooked rice R1 becomes coplanar with the upper surface 11 of the molding frame 10.

In the cooked rice molding-by-leveling step S3, an operator who performs cooked rice supply step S2 or an operator who is positioned on a downstream side of the previous operator spreads the cooked rice by leveling such that the entire region of the cooked rice storing space 31 is filled with the cooked rice using a leveling jig thus molding the molded cooked rice lump R2 having the thickness that agrees with the thickness of the molding frame 10 and the shape as viewed in a plan view that agrees with the shape of the cooked rice storing space 31 as viewed in a plan view.

Particularly, in a case where the leveling spatula 70 is used as the leveling jig in the cooked rice molding-by-leveling step S3, the respective corner portions of the leveling spatula 70 are respectively aligned with the respective corner portions of an approximately right angle as viewed in a plan view in the cooked rice storing space 31, and cooked rice R1 stored in the cooked rice storing space 31 is spread by leveling using the relative positions of the respective portions of the leveling spatula 70 and the cooked rice storing space 31. That is, in step S3, the following spreading-by-leveling steps S3-1 to S3-4 are performed.

(Step S3-1)

Step S3-1 is a cooked rice front left side spreading-by-leveling step where the front right side corner portion 75' of the leveling spatula 70 is moved correspondingly to the front left corner portion of the cooked rice storing space 31 with respect to a front left half portion of the cooked rice R1.

(Step S3-2)

Step S3-2 is a cooked rice rear left side spreading-by-leveling step where the front left side corner portion 75 of the leveling spatula 70 is moved correspondingly to the rear left corner portion of the cooked rice storing space 31 with respect to a rear left half portion of the cooked rice R1.

(Step S3-3)

Step S3-3 is a cooked rice front right side spreading-by-leveling step where the rear right side corner portion 76' of the leveling spatula 70 is moved correspondingly to the front right corner portion of the cooked rice storing space 31 with respect to a front right half portion of the cooked rice R1.

(Step S3-4)

Step S3-4 is a cooked rice rear right side spreading-by-leveling step where the rear left side corner portion 76 of the leveling spatula 70 is moved correspondingly to the rear right corner portion of the cooked rice storing space 31 with respect to a rear right half portion of the cooked rice R1.

That is, the respective steps S3-1 to S3-4 are performed in a stepwise manner by making the respective corner portions 75', 75, 76', 76 of the spatula body portion 72 correspond to the respective four corner portions of the cooked rice storing space 31. In this embodiment, in the cooked rice molding-by-leveling step S3, the spatula body portion 72 draws a trajectory having an approximately "N" horizontally flipped shape as viewed in a plan view. The order of the spreading-by-leveling steps S3-1 to S3-4 at respective four stages of the cooked rice molding-by-leveling step S3 is not limited to this embodiment, and the cooked rice molding-by-leveling step S3 may be performed by changing the order of the steps at respective stages.

[Step S4: Frame Removing Step]

The frame removing step S4 is a step where the plate-shaped cooked rice R3 is obtained by removing the molding frame 10 from the molded cooked rice lump R2 that is formed by spreading cooked rice in the cooked rice storing space 31 by leveling.

In the frame removing step S4, an operator in charge of the cooked rice molding-by-leveling step S3 or an operator positioned on a downstream side of the previous operator removes the molding frame 10 from the molded cooked rice lump R2 by removing the molding frame 10 that surrounds the outer periphery of molded cooked rice lump R2 from the base plate 20 thus obtaining the plate-shaped cooked rice R3 in a state where the lower bottom surface of the plate-shaped cooked rice R3 is integrally formed with the sheet-shaped food S and the plate-shaped cooked rice R3 is placed on the slatted mat 50 on the base plate.

[Step 5: Cooked Rice Food Reshaping Step]

The cooked rice food reshaping step S5 is a step where the cooked rice food R4 is obtained by forming the plate-shaped cooked rice R3 in a state where the plate-shaped cooked rice R3 is placed on the slatted mat 50 is formed into a rolled state or into a folded state such as a twofold state.

In the cooked rice food reshaping step S5, the operation who is in charge of the frame removing step S4 or the operator positioned on a downstream side of the previous operator places an ingredient I such as a luncheon meat or a Japanese omelet on either one of the longitudinal half portions of the plate-shaped cooked rice R3. As illustrated in FIG. 11(a), the operator grips either one of the front-side grip lug portion 54 and the rear-side grip lug portion 55 of the slatted mat 50 that are exposed at the front and rear side notched portions 22, 23 of the base portion 20, and reshapes the plate-shaped cooked rice R3 in twofold together with the slatted mat 50 as illustrated in FIG. 11(b) into the cooked rice food R4 that contains the ingredient I.

As has been described above, according to the method of manufacturing a plate-shaped cooked rice according to the present invention, by simply arranging the operators on one side of the conveyance unit 100 along the conveyance direction and by arranging the operators such that the operators share the steps corresponding to the various steps S1 to S5, an amount of burden that the operator has to bear can be reduced as much as possible, and the plate-shaped cooked rice R3 having favorable moldability with no "thickness irregularities" can be continuously manufactured. Further, the cooked rice food R4 in a final mode can be manufactured by reshaping in an efficient assembly-line operation.

REFERENCE SIGNS LIST

A: plate-shaped cooked rice molding jig
10: molding frame
11: upper surface
12: lower surface
13: inner side surface (side molding surface)
14: outer side surface
20: base plate
21; upper surface
21a: lower molding surface
22: front side notched portion 23: rear side notched portion
30: through window
40: slatted mat placing portion
41: slatted mat placing stepped portion
50: slatted mat
51: upper surface
52: outer side surface
53: sheet-shaped food mounting portion
54: front-side gripping lug portion
55: rear-side gripping lug portion
60: molding frame fitting engagement portion
61: frame mounting stepped portion

The invention claimed is:

1. A plate-shaped cooked rice molding jig for storing a cooked rice therein and molding the cooked rice into a plate-shaped cooked rice, the plate-shaped cooked rice molding jig comprising:
a molding frame having a through window formed of a side molding surface that molds an outer peripheral side portion of the plate-shaped cooked rice; and
a base plate having a lower portion molding surface that molds a bottom side portion of the plate-shaped cooked rice on an upper surface of the base plate, wherein
in a state where the molding frame is mounted on the base plate, a cooked rice storing space that stores the cooked rice by covering the through window by the base plate from below is formed, and a slatted mat placing portion for placing a slatted mat between the molding frame and the base plate are formed,
the slatted mat placing portion is formed of a slatted mat placing stepped portion where an inner side surface is formed as a contact surface that is brought into contact with an outer side surface of the slatted mat and an upper surface of the slatted mat placing stepped portion is formed as a surface on which the molding frame is mounted thus allowing the slatted mat to engage with the slatted mat placing stepped portion, and the slatted mat placing stepped portion protrudes from the upper surface of the base plate,
the base plate has notched portions formed in front and rear sides by cutting away front and rear end edge center portions of the base plate, and
the slatted mat has hand gripping portions formed in an outwardly protruding manner on front and rear sides that are exposed at the notched portions in the front and rear sides of the base plate, in a state where the slatted mat is placed on the slatted mat placing portion.

2. The plate-shaped cooked rice molding jig according to claim 1, wherein in a state where the molding frame is configured such that the slatted mat is mounted on the slatted mat placing portion and the molding frame is mounted on the base plate, a slatted mat pressing protruding portion that is brought into contact with and corresponds with an upper surface of the slatted mat is formed in a downwardly protruding manner from a lower side opening edge of the through window.

3. A plate-shaped cooked rice manufacturing device comprising:
the plate-shaped cooked rice molding jig according to claim 1;
a conveyance unit for conveying the plate-shaped cooked rice molding jig; and
a cooked rice supply unit that is disposed at a start end portion or a middle portion of the conveyance unit, and discharges a predetermined amount of the cooked rice toward the inside of the plate-shaped cooked rice molding jig from a position above the conveyance unit.

4. The plate-shaped cooked rice manufacturing device according to claim 3, wherein the conveyance unit includes a pair of conveyance rails held at a predetermined interval, and is configured to be capable of conveying the plate-shaped cooked rice molding jig in a state where both end portions of the plate-shaped cooked rice molding jig are supported between the conveyance rails.

5. The plate-shaped cooked rice manufacturing device according to claim 4, wherein the conveyance rail includes: a guide longitudinal wall portion of a vertical portion that is brought into contact with and corresponds to an outer side wall portion of the plate-shaped cooked rice molding jig; and a guide lateral wall portion of a horizontal portion that extends in an orthogonal direction from the guide longitudinal wall portion and is brought into contact with and corresponds to an outer bottom wall portion of the plate-shaped cooked rice molding jig.

6. The plate-shaped cooked rice manufacturing device according to claim 5, wherein the guide lateral wall portion includes a plurality of conveyance rollers that are rotatably and pivotally supported along an extending direction of the conveyance rail.

* * * * *